US012539170B2

(12) United States Patent
Pellegrino

(10) Patent No.: US 12,539,170 B2
(45) Date of Patent: Feb. 3, 2026

(54) ORTHOGONALLY ORIENTED STEERING CONTROLS FOR ICE CATHETER

(71) Applicant: yoR Labs, Inc., Beaverton, OR (US)

(72) Inventor: Dakota Pellegrino, Hillsboro, OR (US)

(73) Assignee: yoR Labs, Inc., Beaverton, OR (US)

( * ) Notice: Subject to any disclaimer, the term of this patent is extended or adjusted under 35 U.S.C. 154(b) by 842 days.

(21) Appl. No.: 17/820,139

(22) Filed: Aug. 16, 2022

(65) Prior Publication Data

US 2023/0059122 A1 Feb. 23, 2023

Related U.S. Application Data

(60) Provisional application No. 63/260,345, filed on Aug. 17, 2021, provisional application No. 63/260,346, (Continued)

(51) Int. Cl.
*A61B 18/14* (2006.01)
*A61M 25/01* (2006.01)
*A61B 17/00* (2006.01)

(52) U.S. Cl.
CPC ..... *A61B 18/1492* (2013.01); *A61M 25/0147* (2013.01); *A61B 2017/003* (2013.01)

(58) Field of Classification Search
CPC ......... A61B 18/1492; A61B 2017/003; A61M 25/0147

(Continued)

(56) References Cited

U.S. PATENT DOCUMENTS 4,998,132 A 3/1991 Kurogane
5,364,351 A 11/1994 Heinzelman et al.
(Continued)

FOREIGN PATENT DOCUMENTS

AU 2018250516 11/2018
EP 2 288 284 5/2016
(Continued)

OTHER PUBLICATIONS

Lin et al., Jun. 2010, A motion compounding technique for speckle reduction in ultrasound images, Journal of digital imaging 23(3):246-257.
(Continued)

*Primary Examiner* — Phillip A Gray
(74) *Attorney, Agent, or Firm* — KNOBBE, MARTENS, OLSON & BEAR, LLP

(57) ABSTRACT

An intracardiac echocardiography ("ICE") catheter handle, including a housing having a longitudinal axis, the housing having a proximal end and a distal end. A first actuator can be positioned on a first portion of the housing in a plane aligned with the longitudinal axis, the first actuator coupled to a first controller, the first actuator and first controller configured to control a catheter coupled to the first controller in a first direction and a second direction in the first plane. A second actuator can be positioned on a second portion of the housing in a second plane aligned with the longitudinal axis, the second actuator coupled to a second controller, the second actuator and second controller configured to control a catheter coupled to the second controller in a third direction and a fourth direction in the second plane, wherein first plane is aligned orthogonally to the second plane.

20 Claims, 17 Drawing Sheets

Related U.S. Application Data filed on Aug. 17, 2021, provisional application No. 63/260,344, filed on Aug. 17, 2021.

(58) Field of Classification Search
USPC .......................................................... 604/528
See application file for complete search history.

(56) References Cited

U.S. PATENT DOCUMENTS

| | | |
|---|---|---|
| 5,617,371 A | 4/1997 | Williams |
| 5,903,516 A | 5/1999 | Greenleaf et al. |
| 5,908,389 A | 6/1999 | Roundhill et al. |
| 6,031,529 A | 2/2000 | Migos |
| 6,063,030 A | 5/2000 | Vara et al. |
| 6,120,450 A | 9/2000 | Li |
| 6,123,670 A | 9/2000 | Mo |
| 6,132,374 A | 10/2000 | Hossack et al. |
| 6,400,981 B1 | 6/2002 | Govari |
| 6,607,489 B2 | 8/2003 | Hoctor |
| 6,690,963 B2 | 2/2004 | Ben Haim et al. |
| 6,908,434 B1 | 6/2005 | Jenkins et al. |
| 7,090,639 B2 | 8/2006 | Govari |
| 7,423,578 B1 | 9/2008 | Tietjen |
| 7,604,601 B2 | 10/2009 | Altmann et al. |
| 7,648,462 B2 | 1/2010 | Jenkins et al. |
| 7,667,639 B2 | 2/2010 | Cheng et al. |
| 7,682,358 B2 | 3/2010 | Gullickson et al. |
| 7,750,849 B2 | 7/2010 | Hjelmstad |
| 7,831,076 B2 | 11/2010 | Altmann et al. |
| 7,860,553 B2 | 12/2010 | Govari et al. |
| 7,918,793 B2 | 4/2011 | Altmann et al. |
| 7,996,060 B2 | 8/2011 | Trofimov et al. |
| 8,075,486 B2 | 12/2011 | Tal |
| 8,285,364 B2 | 10/2012 | Barbagli et al. |
| 8,390,438 B2 | 3/2013 | Olson et al. |
| 8,449,467 B2 | 5/2013 | Wilser et al. |
| 8,517,946 B2 | 8/2013 | Kim |
| 8,676,290 B2 | 3/2014 | Tegg |
| 8,690,871 B2 | 4/2014 | Partlett et al. |
| 8,702,612 B2 | 4/2014 | Hendriks et al. |
| 8,989,842 B2 | 3/2015 | Li et al. |
| 9,030,354 B2 | 5/2015 | Natarajan |
| 9,055,883 B2 | 6/2015 | Tgavalekos et al. |
| 9,095,682 B2 | 8/2015 | Romoscanu |
| 9,132,913 B1 | 9/2015 | Shapiro et al. |
| 9,179,890 B2 | 11/2015 | Ionasec et al. |
| 9,211,160 B2 | 12/2015 | Pivotto et al. |
| 9,261,595 B2 | 2/2016 | Garbini et al. |
| 9,323,445 B2 | 4/2016 | Kritt et al. |
| 9,342,156 B2 | 5/2016 | Huh |
| 9,922,554 B2 | 3/2018 | Mikuni et al. |
| 9,931,487 B2 | 4/2018 | Quinn et al. |
| 9,986,969 B2 | 6/2018 | Call et al. |
| 10,183,149 B2 | 1/2019 | Tegg et al. |
| 10,206,652 B2 | 2/2019 | Deno et al. |
| 10,368,951 B2 | 8/2019 | Moll et al. |
| 10,401,492 B2 | 9/2019 | Brooks |
| 10,405,830 B2 | 9/2019 | Garbini et al. |
| 10,463,439 B2 | 11/2019 | Joseph et al. |
| 10,499,882 B2 | 12/2019 | Hunter et al. |
| 10,537,307 B2 | 1/2020 | Yang |
| 10,555,780 B2 | 2/2020 | Tanner et al. |
| 10,624,612 B2 | 4/2020 | Sumi |
| 11,255,964 B2 | 2/2022 | Brooks |
| 11,344,281 B2 | 5/2022 | Morisse et al. |
| 11,547,386 B1 | 1/2023 | Roy et al. |
| 11,892,542 B1 | 2/2024 | Brooks |
| 2002/0173721 A1 | 11/2002 | Grunwald |
| 2002/0173722 A1 | 11/2002 | Hoctor et al. |
| 2003/0007598 A1 | 1/2003 | Wang et al. |
| 2003/0055334 A1 | 3/2003 | Steinbacher et al. |
| 2003/0055337 A1 | 3/2003 | Lin |
| 2004/0102700 A1 | 5/2004 | Asafusa |
| 2005/0288588 A1 | 12/2005 | Weber et al. |
| 2007/0027733 A1 | 2/2007 | Balle |
| 2007/0174772 A1 | 7/2007 | Gorman |
| 2007/0200760 A1 | 8/2007 | Hjelmstad |
| 2007/0239001 A1 | 10/2007 | Mehi et al. |
| 2007/0259158 A1 | 11/2007 | Friedman et al. |
| 2008/0012753 A1 | 1/2008 | Cheng |
| 2008/0114239 A1 | 5/2008 | Randall et al. |
| 2008/0146940 A1 | 6/2008 | Jenkins et al. |
| 2008/0215046 A1* | 9/2008 | Messing ................ A61B 18/00 606/1 |
| 2008/0306385 A1 | 12/2008 | Jago |
| 2009/0043206 A1 | 2/2009 | Towfiq et al. |
| 2009/0118620 A1 | 5/2009 | Tgavalekos et al. |
| 2009/0171275 A1 | 7/2009 | Ostrovsky et al. |
| 2009/0250729 A1 | 10/2009 | Lemmerhirt |
| 2009/0271704 A1 | 10/2009 | Cohen |
| 2010/0030076 A1 | 2/2010 | Vortman et al. |
| 2010/0081938 A1 | 4/2010 | Kato |
| 2010/0146431 A1 | 6/2010 | Raji et al. |
| 2010/0160784 A1 | 6/2010 | Poland |
| 2010/0168580 A1 | 7/2010 | Thiele |
| 2010/0234831 A1 | 9/2010 | Hinman et al. |
| 2010/0251823 A1 | 10/2010 | Adachi |
| 2011/0077524 A1 | 3/2011 | Oshiki et al. |
| 2011/0137132 A1 | 6/2011 | Gustafson |
| 2011/0208052 A1 | 8/2011 | Entrekin |
| 2012/0075208 A1 | 3/2012 | Tamiya et al. |
| 2012/0157851 A1 | 6/2012 | Zwirn |
| 2012/0254747 A1 | 10/2012 | Bocirnea |
| 2013/0015975 A1 | 1/2013 | Huennekens et al. |
| 2013/0120296 A1 | 5/2013 | Merritt et al. |
| 2013/0227052 A1 | 8/2013 | Wenzel |
| 2013/0234891 A1 | 9/2013 | Natarajan et al. |
| 2013/0238990 A1 | 9/2013 | Ubillos et al. |
| 2013/0253317 A1 | 9/2013 | Gauthier |
| 2013/0274712 A1 | 10/2013 | Schecter et al. |
| 2013/0310690 A1 | 11/2013 | Chang |
| 2014/0035916 A1 | 2/2014 | Murphy |
| 2014/0046188 A1 | 2/2014 | Yen et al. |
| 2014/0058266 A1 | 2/2014 | Call et al. |
| 2014/0087342 A1 | 3/2014 | Campanatti, Jr. |
| 2014/0164965 A1 | 6/2014 | Lee et al. |
| 2014/0189560 A1 | 7/2014 | Caspi |
| 2014/0219059 A1 | 8/2014 | Younghouse |
| 2014/0336573 A1 | 11/2014 | Yu et al. |
| 2015/0019488 A1 | 1/2015 | Higginson et al. |
| 2015/0065877 A1 | 3/2015 | Orderud |
| 2015/0082251 A1 | 3/2015 | Lam |
| 2015/0293223 A1 | 10/2015 | Park et al. |
| 2016/0054901 A1 | 2/2016 | Yang et al. |
| 2016/0095650 A1 | 4/2016 | Greifenender et al. |
| 2016/0157824 A1 | 6/2016 | Park et al. |
| 2016/0161589 A1 | 6/2016 | Benattar |
| 2016/0161594 A1 | 6/2016 | Benattar |
| 2016/0161595 A1 | 6/2016 | Benattar |
| 2016/0165338 A1 | 6/2016 | Benattar |
| 2016/0165341 A1 | 6/2016 | Benattar |
| 2016/0220300 A1* | 8/2016 | Cohen ................ A61B 18/1492 |
| 2016/0338676 A1 | 11/2016 | Berger et al. |
| 2017/0072167 A1 | 3/2017 | Weitzner et al. |
| 2017/0090571 A1 | 3/2017 | Bjaerum |
| 2017/0153801 A1 | 6/2017 | Kim et al. |
| 2017/0266413 A1 | 9/2017 | Khuu et al. |
| 2017/0307755 A1 | 10/2017 | Brooks |
| 2017/0326337 A1 | 11/2017 | Romoscanu et al. |
| 2017/0343655 A1 | 11/2017 | Solek et al. |
| 2017/0343668 A1 | 11/2017 | Brooks et al. |
| 2018/0000449 A1 | 1/2018 | Moore et al. |
| 2018/0000453 A1 | 1/2018 | Hunter et al. |
| 2018/0003811 A1 | 1/2018 | Pellegretti |
| 2018/0055483 A1 | 3/2018 | Hunter |
| 2018/0064415 A1 | 3/2018 | Zhai et al. |
| 2018/0361145 A1 | 12/2018 | Mahapatra et al. |
| 2019/0201110 A1 | 7/2019 | Kuenen |
| 2019/0245310 A1 | 8/2019 | Medina et al. |
| 2019/0261953 A1 | 8/2019 | Honjo et al. |
| 2019/0307427 A1 | 10/2019 | Levy et al. |
| 2019/0353975 A1 | 11/2019 | DiDomenico |
| 2020/0000430 A1 | 1/2020 | Chamberlain |
| 2020/0046321 A1 | 2/2020 | Duda |

(56) References Cited

U.S. PATENT DOCUMENTS

| | | |
|---|---|---|
| 2020/0060646 A1 | 2/2020 | Lindenroth et al. |
| 2020/0170662 A1 | 6/2020 | Vardi |
| 2020/0178928 A1 | 6/2020 | Park et al. |
| 2020/0183004 A1 | 6/2020 | Gong et al. |
| 2020/0205783 A1 | 7/2020 | Shiran |
| 2020/0268351 A1 | 8/2020 | Chiang |
| 2020/0281565 A1 | 9/2020 | Yee et al. |
| 2020/0315592 A1 | 10/2020 | Soleimani et al. |
| 2020/0330076 A1 | 10/2020 | Weber |
| 2020/0345415 A1* | 11/2020 | Sharma .............. A61B 18/1492 |
| 2021/0007710 A1 | 1/2021 | Douglas |
| 2021/0022716 A1 | 1/2021 | Kerby |
| 2021/0030394 A1 | 2/2021 | Caswell et al. |
| 2021/0038334 A1 | 2/2021 | Hsu et al. |
| 2021/0125503 A1 | 4/2021 | Henry et al. |
| 2021/0177379 A1 | 6/2021 | Kolen et al. |
| 2021/0338208 A1 | 11/2021 | Nguyen et al. |
| 2021/0401400 A1 | 12/2021 | Sheehan et al. |
| 2021/0401508 A1 | 12/2021 | Zhao |
| 2022/0061811 A1 | 3/2022 | Terleski |
| 2022/0061814 A1 | 3/2022 | Morrise |
| 2022/0061906 A1 | 3/2022 | Gommeren et al. |
| 2022/0151591 A1 | 5/2022 | Morrise |
| 2022/0156094 A1 | 5/2022 | Morrise |

FOREIGN PATENT DOCUMENTS

| | | |
|---|---|---|
| EP | 3 275 478 | 1/2018 |
| EP | 2 707 076 | 11/2018 |
| EP | 3 050 214 | 3/2019 |
| EP | 2 632 318 | 11/2019 |
| EP | 3 518 777 | 3/2021 |
| WO | WO 02/13682 | 2/2002 |
| WO | WO 09/079695 | 7/2009 |
| WO | WO 12/088535 | 6/2012 |
| WO | WO 17/185097 | 10/2017 |
| WO | WO 20/049012 | 3/2020 |
| WO | WO 20/252416 | 12/2020 |

OTHER PUBLICATIONS

Pandian et al., Jun. 18, 1992, Intravascular ultrasound and intracardiac echocardiography: concepts for the future, American Journal of Cardiology, 69(20):H6-H17.

Bradley, Aug. 2008, Retrospective transmit beamformation: Acuson SC2000 volume imaging ultrasound system, Siemens Medical Solutions USA, Inc., whitepaper, 8 pp.

* cited by examiner

ORTHOGONALLY ORIENTED STEERING CONTROLS FOR ICE CATHETER

INCORPORATION BY REFERENCE TO ANY PRIORITY APPLICATIONS

The present application claims the benefit of U.S. Provisional Patent Application No. 63/260,345, filed Aug. 17, 2021, U.S. Provisional Patent Application No. 63/260,346, filed Aug. 17, 2021, and U.S. Provisional Patent Application No. 63/260,344, filed Aug. 17, 2021. Each one of the above-listed disclosures is incorporated herein by reference in its entirety. Any and all applications for which a foreign or domestic priority claim is identified in the Application Data Sheet as filed with the present application are hereby incorporated by reference under 37 CFR 1.57.

TECHNICAL FIELD

The invention relates to controlling ultrasound imaging using an Intra Cardiac Echocardiography ("ICE") catheter. Specifically, the invention relates to an ICE catheter handle for use in intra cardiac echocardiography.

SUMMARY

Certain aspects of this invention are defined by the independent claims. The dependent claims concern optional features of some embodiments of the invention. The systems, methods, and devices described herein each have several aspects, no single one of which is solely responsible for its desirable attributes. Without limiting the scope of this disclosure, several non-limiting features will now be discussed briefly.

One innovation includes an intra-cardiac echocardiography ("ICE") catheter handle, including a housing having a longitudinal axis, the housing having a proximal end and a distal end; a first actuator coupled to a first controller, the first actuator configured to move in a first plane and in a direction along the longitudinal axis to control a catheter, coupled to the housing, to move in a first direction and a second direction, the first direction being opposite to the second direction; and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane. In another example, an intracardiac echocardiography ("ICE") catheter handle, includes a housing having a longitudinal axis, the housing having a proximal end and a distal end; a first actuator positioned on a first portion of the housing in a plane that is aligned with the longitudinal axis, the first actuator coupled to a first controller, the first actuator and first controller configured to control a catheter coupled to the first controller in a first direction and a second direction in the first plane; and a second actuator positioned on a second portion of the housing in a second plane that is aligned with the longitudinal axis, the second actuator coupled to a second controller, the second actuator and second controller configured to control a catheter coupled to the second controller in a third direction and a fourth direction in the second plane, wherein first plane is aligned orthogonally to the second plane.

Another innovation includes an intra-cardiac echocardiography ("ICE") catheter, including a catheter handle having a housing having a longitudinal axis, the housing having a proximal end and a distal end, a first actuator coupled to a first controller, the first actuator configured to move in a first plane and in a direction along the longitudinal axis to control a catheter, coupled to the housing, to move in a first direction and a second direction, the first direction being opposite to the second direction, and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane, and an ICE catheter coupled to the catheter handle.

Another innovation includes a method of steering of intra-cardiac echocardiography ("ICE") catheter, the method comprising providing an ICE catheter handle coupled to an ICE catheter, the ICE catheter handle having a housing having a longitudinal axis, the housing having a proximal end and a distal end, a first actuator coupled to a first controller, the first actuator configured to move in a first plane and in a direction along the longitudinal axis to control a catheter, coupled to the housing, to move in a first direction and a second direction, the first direction being opposite to the second direction, and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane; moving the first actuator within the first plane to move a proximal end of the catheter in the first direction; and moving the second actuator within the second plane to move the proximal end of the catheter in the second first direction.

Another innovation includes an intra-cardiac echocardiography ("ICE") catheter handle, comprising a housing having a longitudinal axis, the housing having a proximal end and a distal end; a first actuator coupled for controlling movement of a tip of a catheter coupled to the housing in a first direction and a second direction, the first direction opposite the second direction and substantially in a first plane, wherein the location of the first actuator on the housing is substantially within the first plane; and a second actuator coupled for controlling movement of the tip of a catheter coupled to the housing in a third direction and a fourth direction, the third direction opposite the fourth direction and substantially in a second plane, wherein the location of the second actuator on the housing is substantially within the second plane.

Another innovation includes an intra-cardiac echocardiography ("ICE") catheter handle, comprising a housing having a longitudinal axis and having a vertical and horizontal orientation; a posterior/anterior steering control is positioned along the vertical orientation of the handle, the posterior/anterior steering control actuatable to control movement of a proximal portion of the catheter in a posterior and anterior direction; and a left/right steering control positioned along the horizontal orientation of the handle, the left/right steering control actuatable to control movement of the proximal portion of the catheter in a left or right direction.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE PREFERRED EMBODIMENT

Overview

Figure 1:
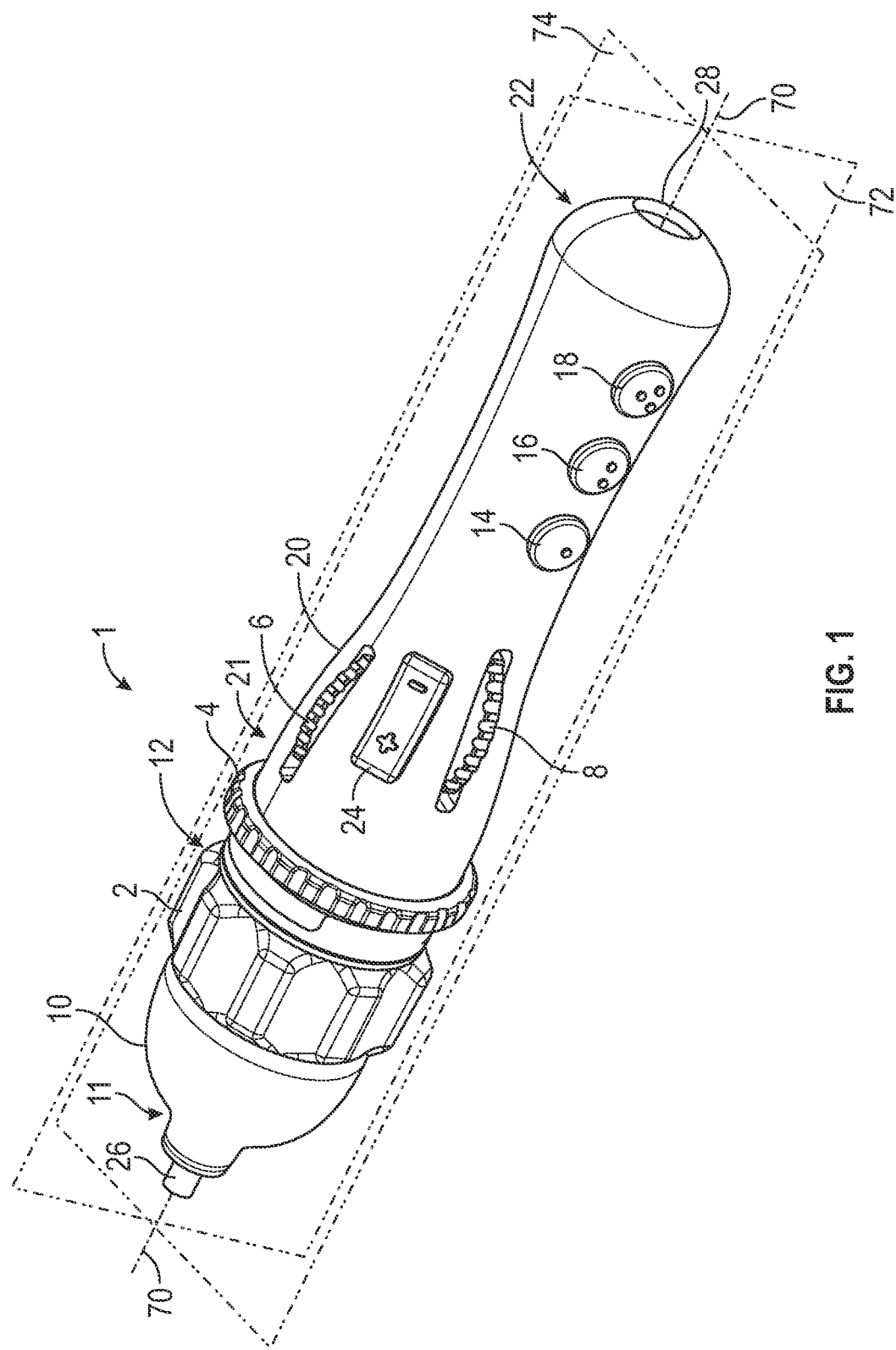
FIG. 1 is a perspective view of an example of an ICE catheter handle 1, illustrating various structural and functional features of some embodiments.

Catheter-based intra-cardiac echocardiography (ICE) is an imaging modality of some similarity to intra-vascular ultrasound (IVUS). ICE is widely used during interventional cardiac procedures to visualize anatomical features, for example, the atrial septum, the aortic valve, pulmonary veins, etc. ICE can also be used to image interventional devices such as ablation catheters and lasso catheters that are used in performing medical procedures on the heart. ICE catheters include an array of ultrasound transducer elements which is used to generate an ultrasound image, for example, a two-dimensional image "slice." In various applications, the array can be moved to generate information that is processed and can be displayed as a two-dimensional (2D) image or a three-dimensional (3D) image. Such imaging allows collection of information inside the heart and can be used to visualize cardiac structures and blood flow using Doppler imaging.

When an ICE catheter is deployed, its shape may be bent or curved to reach the target of interest, or a point near the target of interest. To move the ICE catheter to the desired imaging area, conventional ICE catheters, and nearly all catheters, have coaxial rings positioned on the handle for steering control, the axis of the rings being aligned with a longitudinal axis of a catheter handle. ICE catheters accomplish steering control by rotating one ring for steering in an anterior/posterior (up/down) direction, and by rotating the other ring for steering in a left/right direction. The rotation of these rings can be transferred into bending of the catheter shaft by pull wires and a system of pulleys. The fundamental challenge of this control method is that the movement of the rings does not logically map to the movement of the catheter. This challenge is tenable when the catheter is visible but becomes significantly more challenging when the catheter is occluded by the body.

The disclosed embodiments provide a steering mechanism that takes these bending controls and orients them to the corresponding movement of the catheter shaft. As the catheter steering is in two orthogonal planes, the configuration or layout of the controls can follow this same orientation such that the controls can be orthogonally aligned on a catheter handle. In some embodiments, the steering controls include thumbwheels that are orthogonally arranged on a catheter handle. For example, a first control wheel can be disposed in a first plane coincident with the longitudinal axis of the catheter handle to correspond to posterior/anterior movement along the first plane. A second control wheel can be disposed in a second plane that is orthogonal to the first plane and coincident with the longitudinal axis of the catheter handle, and the second control wheel is to correspond to left/right movement along the second plane. The combination of the first posterior/anterior movement in the first plane and the second left/right movement in the second plane allows the tip of the catheter to be steered, bending the catheter tip as needed as it is navigated towards and in a heart. By orienting the controls in the direction of their steering effect, steering control of the catheter in vivo significantly easier for the operator. As used herein, if two things are "orthogonally aligned" it generally means they are aligned 90 degrees or nearly so with respect each other. In some examples, they orthogonally aligned can refer to an alignment that of the items at 90 degrees plus or minus about 1, 2, 3, 4, 5, 6, 7, 8, 9, 10, 11, 12, 13, 14, or 15 degrees.

List of Certain Components

The following is a list of certain components that are described and enumerated in this disclosure in reference to the above-listed figures. However, any aspect of the devices illustrated in the figures, whether or not named out separately herein, can form a portion of various embodiments of the invention and may provide basis for claim limitation relating to such aspects, with or without additional description. Generally, herein, reference to a "proximal" portion indicates a portion/component that is positioned closest to the patient when the device/component is in use (e.g., during an intracardiac echocardiography procedure), and reference to a "distal" portion indicates a portion/component that is positioned farther from the patient when the device/component is in use. The enumerated components include:

1 catheter handle
2 rotation collar
4 locking ring
6 first actuator (posterior/anterior thumbwheel)
7 pivot for actuator 6
8 second actuator (left/right thumbwheel)
9 pivot for actuator 8
10 cap, proximal portion of handle
11 proximal end of the cap 10
12 distal end of the cap 10
14 control button
16 control button
18 control button
20 handle end, distal portion of handle
21 proximal end of the handle end 20
22 distal end of the handle end 20
24 rocker switch
26 catheter cord
27 internal portion (lumen) of catheter
28 connector port in handle
29 cable, for providing signals to processing equipment
30a, 30b pushrods coupled to the second actuator 8
30c, 30d pushrods coupled to the second actuator 8
31a rounded end for actuator 30a
31b rounded end for actuator 30b
31c rounded end for actuator 30c
31d rounded end for actuator 30d
32 swash plate
33 proximal surface, swash plate 32
34 center pivot
36 pullwire feedthrough
38a-d pullwire anchors
40 center tube
41 proximal end of catheter
42 locking edge
44 locking recess
46 handle electrical interface
48 cap electrical interface
50 first controller
52 second controller
54 pushrod proximal end
56 pushrod distal end
58 pivot tip of center pivot 34
60 round rod, coupled to swash plate 32
62a-d pullwires
70 proximal end to distal end axis
72 plane 1
74 plane 2
80 swash plate ring
82a-d wires
84a, 84b translational movement wires
86a, 86b rotational movement at the swash plate ring
90 catheter ring
92a, 92b rotational movement at the catheter ring Referring now to the figures, FIG. 1 is a perspective view of an example of an ICE catheter handle 1, illustrating various structural and functional aspects of some embodiments. Various embodiments may include some of the features shown or different features. Although the handle 1 is referred to as an ICE catheter handle because the functionality provided by the components of the handle 1 are advantageous for use with an ICE catheter, other types of catheters can also be used with the handle 1.

In the embodiment illustrated in FIG. 1, the catheter handle 1 includes a cap 10 which is a proximal portion of the catheter handle 1, and a handle end 20 which is a distal portion of the catheter handle 1. The outside surface of the cap 10 is sometimes referred to herein as the cap housing. The outside surface of the handle end 20 is sometimes referred to as the handle housing (or simply housing). Herein, "proximal" refers to the portion of the catheter handle 1 that is closest to the catheter 26 (shown only in part) and to the patient when the catheter handle 1 is used in a medical procedure. The cap 10 includes a proximal end 11 and a distal end 12. The handle end 20 also includes a proximal end 21 and a distal end 22. The handle end 20 further includes a first actuator 6 (or thumbwheel 6), and a second actuator 8 (or thumbwheel 8). The handle end can also include one or more controls of various types, for example, a rocker switch 24 and three buttons 14, 16 & 18. The handle end 20 includes a connector port 28 for connecting the catheter handle 1 to computing equipment (e.g., ultrasound processing equipment, a display, and the like). In this example, the catheter handle 1 also includes a rotation collar 2 aligned perpendicular to a longitudinal axis 70 of the catheter handle 1, for example, such that the axis of the rotation collar 2 aligns with the longitudinal axis 70. The rotation collar 2 is coupled to a catheter 26 at the distal end of the catheter. The proximal end 41 (FIG. 14) of the catheter 26 can include an ultrasound array for generating ICE images. The rotation collar 2 is configured to rotate around the longitudinal axis 70 such that a rotational movement of the rotation collar 2 rotates the catheter 26. The catheter handle 1 also includes a locking ring 4 is positioned on the proximal end 21 of the handle end 20 and perpendicularly aligned to the longitudinal axis 70. The locking ring 4 is configured to rotate around the longitudinal axis to lock a position of the catheter in a certain alignment/position.

In FIG. 1, the ICE catheter handle 1 has a longitudinal axis 70 coincident with the center line if the catheter 1 and going from the proximal end 11 of the cap 10 to the distal end 22 of the handle end 20. Two planes 72 & 74 that are orthogonal to each other are superimposed to the catheter handle 1 for illustration purpose. The plane 72 is the vertical plane in FIG. 1, which passes through the first actuator 6 and is coincident with the axis 70 and the mid-plane of the first actuator 6. And the plane 74 is the horizontal plane in FIG. 1, which passes through the second actuator 8 and is coincident with the axis 70 the mid-plane of the second actuator 8. Since the planes 72 & 74 are orthogonal to each other, the first actuator 6 and the second actuator 8 are also orthogonally disposed in the handle 1.

Figure 2:
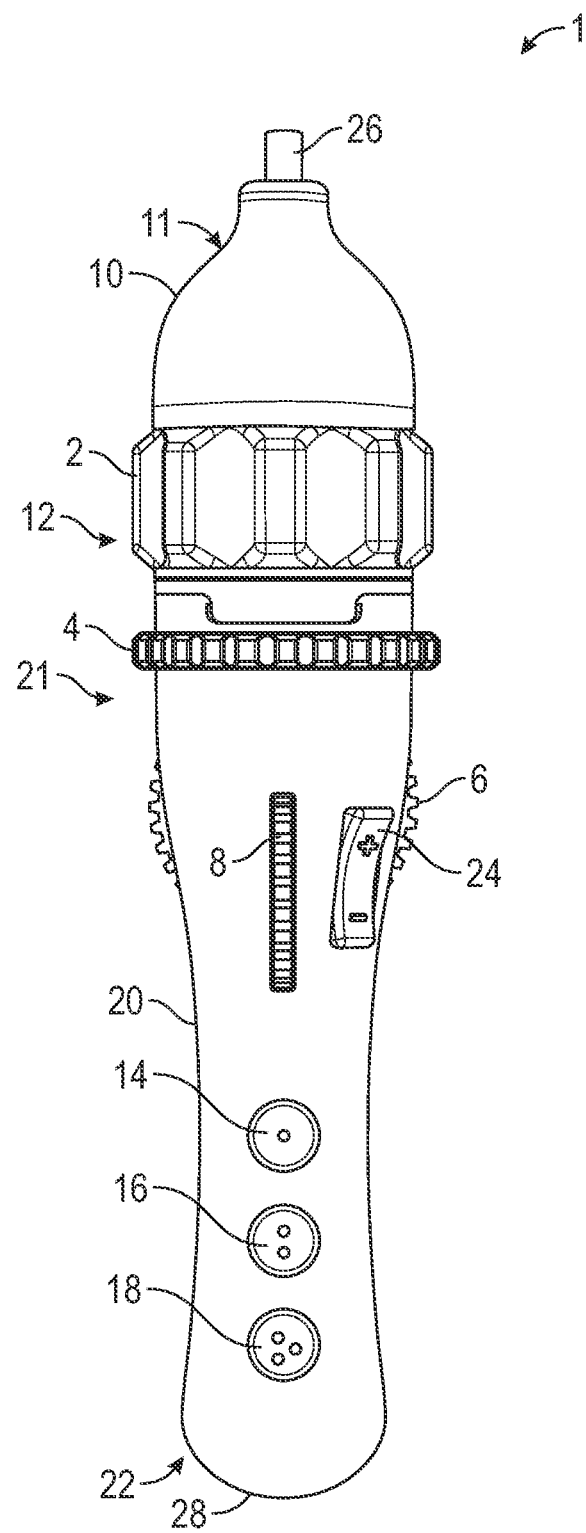
FIG. 2 is a top plan view of the ICE catheter handle shown in FIG. 1.
Figure 3:
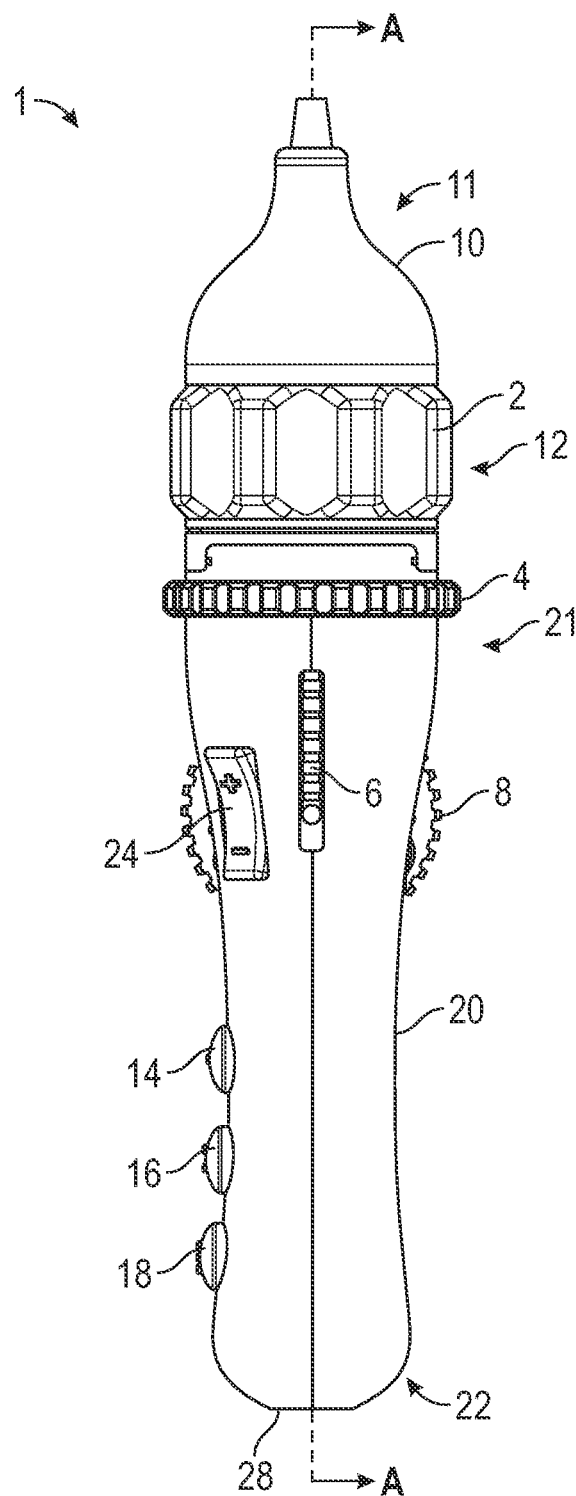
FIG. 3 is a side view of the ICE catheter handle of FIG. 2 rotated 90° with respect to its position in FIG. 2.
Figure 4:
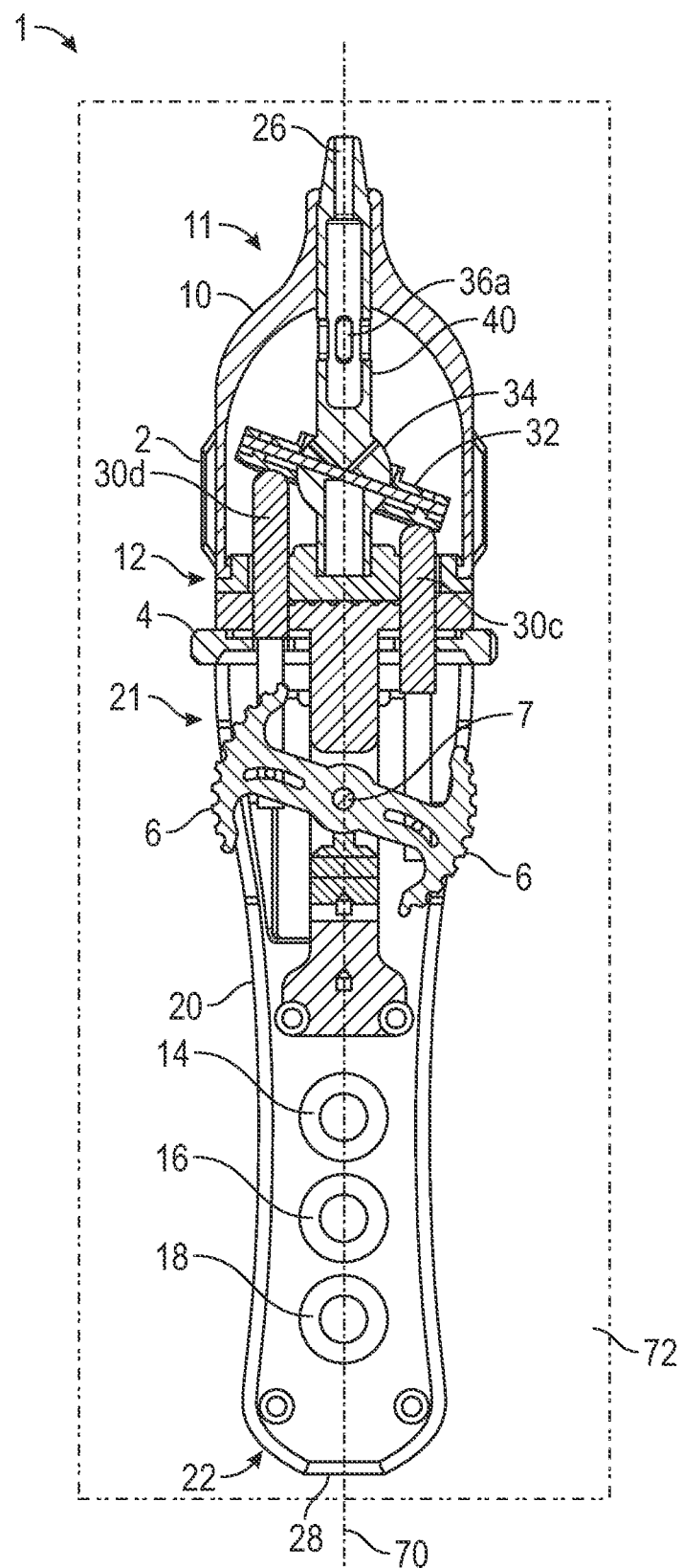
FIG. 4 is a cross-sectional view of the ICE catheter handle 1 shown in FIG. 3 taken along line A-A or the plane 72 in FIG. 1.
Figure 5:
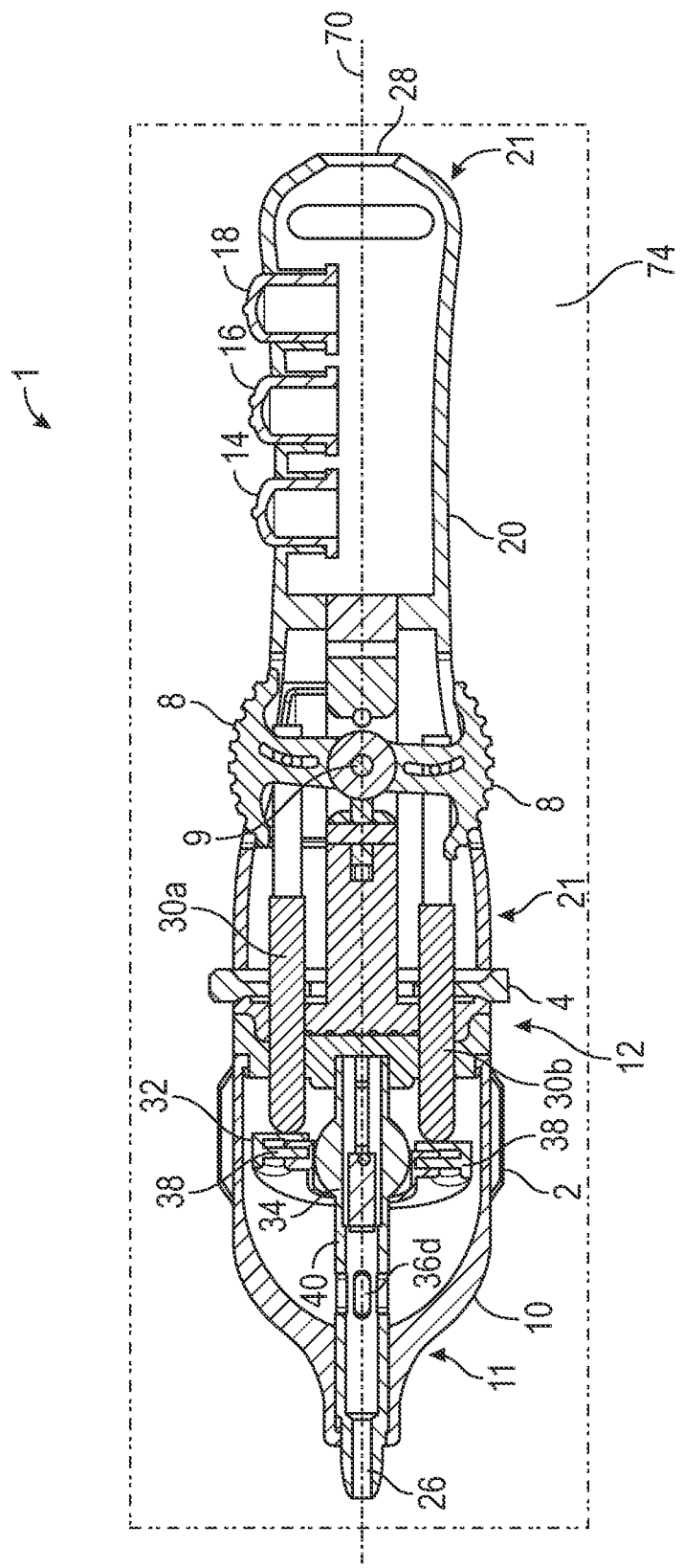
FIG. 5 is a cross-sectional view of the ICE catheter handle 1 shown in FIG. 1 taken along the plane 74.

The features of the ICE catheter handle 1 as shown in FIG. 1 are further illustrated from two different angles in FIG. 2, a top plan view of the catheter handle 1, and in FIG. 3, a side view of the catheter handle 1. In the example illustrated in FIGS. 4-10, a number of components are disposed within the catheter handle 1 that the first actuator 6 and the second actuator 8 are coupled to or are in contact with, and that are used to steer a tip of a catheter 26 that is attached to the catheter handle 1. In this illustrative embodiment, such components are mechanical. For example, as shown in FIGS. 4 and 5, the first actuator 6 is coupled to pushrods 30*a*, 30*b*. The second actuator 8 is coupled to pushrods 30*c*, 30*d*. In this example, the actuators 6, 8 include a slot in the actuator positioned interior to the housing of the catheter handle 1, and two pushrods are coupled to each actuator via a pin extending through the slot. As described herein, the pushrods 30 interact with other components (e.g., swash plate 32) to control/steer the proximal tip of the catheter 26. As used herein, the actuator refers to a control is on the outside of the catheter handle 1 and typically has a portion that extends out of the catheter handle 1. The components that the actuator is coupled to, that are (typically) disposed inside the catheter handle that are used to steer the tip of the catheter can be referred to herein as a "controller." More specifically, the first actuator 6 can be coupled to a first controller (a first set of components) for steering the tip in a first plane (e.g., posterior/anterior or left/right) and the second actuator 8 can be coupled to a second controller (a second set of components) for steering the tip in a second plane (e.g., the other of posterior/anterior or left/right). Portions of the first controller and the second controller can be the same (e.g., the swash plate). This terminology can apply for other embodiments as well, for example, when a controller includes electrical or electronic components.

FIG. 4 illustrates an example of a cross-sectional view of the ICE catheter handle 1 in FIG. 1 taken along line A-A in FIG. 3 which is actually the plane 72, some internal structures in the device are revealed. As can be seen in FIG. 4, in this example the first actuator 6 is coupled with the body of the handle end 20 at a pivot 7 for the actuator 6. And, two pushrods 30*c* & 30*d*, are disposed parallel to the axis 70 and slidably coupled to the first actuator 6 at an equal distance from the center of the actuator 6 at one end and in touch with a swash plate 32 at the other end. When the actuator 6 is rotated about the pivot 7 by the user's thumb or finger, the action forces one of the pushrods to move in a direction aligned with the axis 70 pressing against the swash plate 32 and the other pushrod to move in a direction aligned with the axis 70 but away from the swash plate 32, depending on which direction the actuator 6 is rotated.

FIG. 5 illustrates an example of another cross-sectional view of the ICE catheter handle 1 taken from the plane 74 in FIG. 1, and shows similar internal structures of the catheter handle 1 as compared to FIG. 4. But the actuator shown here is the second actuator 8. Similar to structure described above with FIG. 4, the second actuator 8 is coupled with the body of the hand end 20 through a pivot 9 for this actuator. And, two pushrods, 30*a* & 30*c*, are disposed parallel to the axis 70 and slidably coupled to the second actuator 8 at an equal distance from the center of the actuator. When the actuator 8 is rotated about the pivot 9 by the user's thumb or finger, the action forces one of the pushrods 30*a* & 30*c* to move along the axis 70 pressing against the swash plate 32 and the other pushrod to move along the axis 70 but away from the swash plate 32, depending on which direction the actuator 8 is rotated. Because the first actuator 6 and the second actuator 8 are disposed orthogonal to each other, the pushrods 30*c* & 30*d* and pushrods 30*a* & 30*d* act on the swash plate 32 orthogonally.

In FIGS. 4 and 5 it can also be seen that a center tube 40 is disposed at the center of the handle cap 10. Toward the lower end of the center tube 40 is a sphere-shaped center pivot 34, about which the swash plate 32 is rotated. The upper end of the center tube is connected to the catheter 26.

Figure 6:
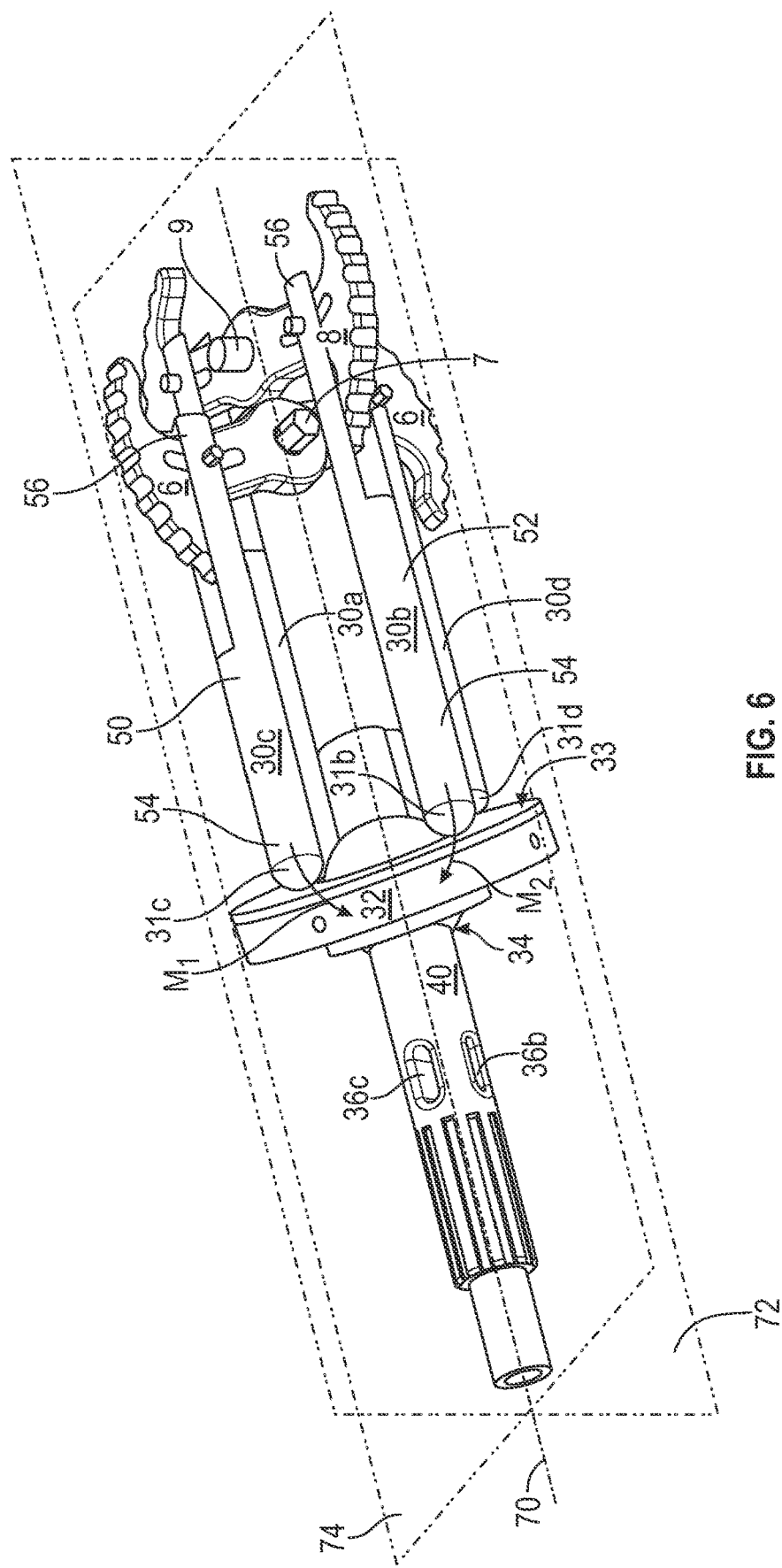
FIG. 6 is a perspective view of an example of certain internal structure of an ICE catheter handle 1 illustrated in FIG. 1 that is used to mechanically control bending of a catheter in two orthogonal directions and allows the rotation of an internal portion of the catheter while an outer portion maintains its shape, where the internal structure includes a swash plate 32 coupled to a pivot 34, and pushrods 38a-38d coupled to two orthogonally aligned thumbwheels 6 & 8.

The relationship between the four pushrods 30*a*-30*d* and the swash plate 32 is more clearly illustrated in FIG. 6, which is an example perspective view of an assembly of some internal parts of the ICE catheter handle 1 shown in FIG. 1. This assembly of internal parts is used to mechanically control the flexing and bending of a proximal end 41 of the catheter 26 which include an ultrasound array which is used to generate ICE images. In FIG. 6 are also established the longitudinal axis 70, and the two orthogonal planes 72 & 74 shown in FIG. 1. According to FIG. 6, the actuator 6 is rotated in such a way to cause the pushrod 30*c* having a rounded head 31*c* on the distal end to push against a proximal surface 33 of the swash plate 32, while the pushrod 30*d* moves away from the swash plate 32. Similarly, the actuator 8 is rotated in such a way to cause the pushrod 30*b* having a rounded head 31*b* to push against the proximal surface 33 of the swash plate 32, while the pushrod 30*a* moves away from the swash plate 32. The rotations of the actuators 6 & 8 can be reversed to cause reversed actions for pushrod pairs 30*c* & 30*d* and 30*c* & 30*d*. The pushing force from the pushrod 30*c* to the swath plat 32 causes a moment M1 on the swash plate 32, and the moment M1 is on plane 72 and rotating about the pivot 34, resulting the swath plate to rotate about the pivot 34. Similarly, the pushing force from the pushrod 30*b* to the swath plat 32 causes a moment M2 on the swash plate 32, and the moment M2 is one plane 74 and rotating about the pivot 34, resulting the swath plate to rotate about the pivot 34. Therefore, the two moments, M1 and M2, are orthogonal to each other. As such, by turning the actuators 6&8 in both directions, the combined effect of the orthogonal moments M1 and M2 is that the swash plate 32 is able to tilt in all different directions, the so called "universal" pivoting.

Figure 7:
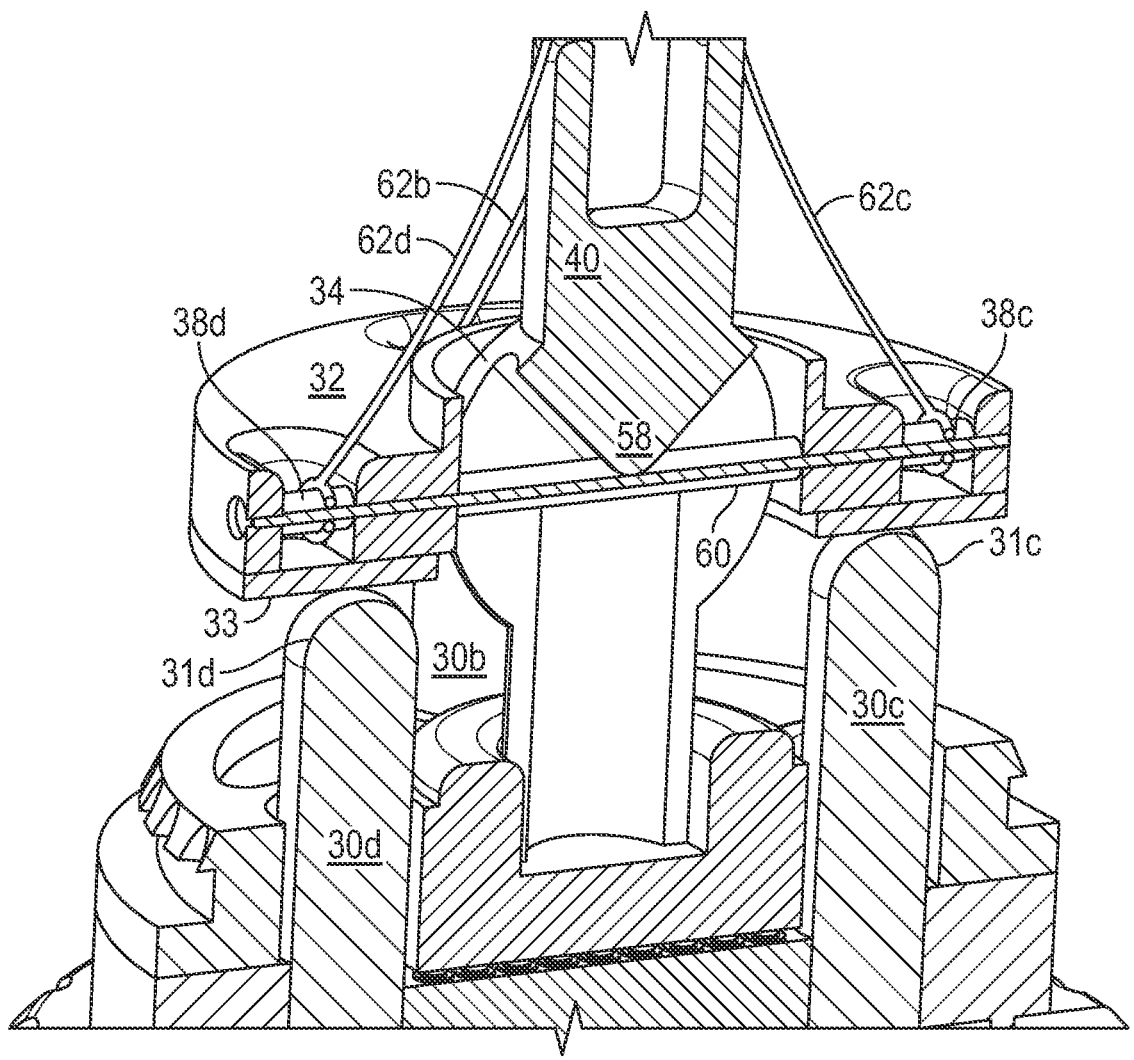
FIG. 7 is a cross-sectional view of an example of internal structure of an ICE catheter handle 1 along the plane 72 in FIG. 1, illustrating details of pushrods 30b, 30c & 30d, a swash plate 32 with a round rod 60, a pivot 34 with a pivot tip 58 that allows the swash plate 32 to pivot in two orthogonal directions, a center tube 40, pullwire anchor 38c & 38d, and pullwires 62b, 62c & 62d.

A perspective cross-sectional view of the swashing plate tilting structure discussed with FIG. 6, taken from a plane parallel to and offset from the plane 72, is shown in FIG. 7. As illustrated, the pivoting of the swash plate 32 is achieved by engaging a triangular shaped pivot tip 58 within the center pivot 34 with a round rod 60 coupled to the swash plate 32. The pivot tip 58 has a round groove on top and in contact with the round rod 60. The small size of the pivot tip 58 and the round groove delivers reduced friction of pivoting when the swash plate 32 is pushed by one or two of the pushrods 30*a*-30*d*.

Also illustrated in FIG. 7 is that the round rod 60 is inserted into a hole in the swash plate 32 from edge to edge and coincident with the center line of the swash plate 32. The swash plate 32 has slotted holes close to the edge to expose the ends of the round rod 60 which serve as pullwire anchors 38*c* & 38*d*. And the ends of pullwires 62*c* & 62*d* are coupled to the pullwire anchors 38*c* & 38*d*, respectively. Also shown in FIG. 7 is a third pullwire 62*b*, which is coupled to a corresponding pullwire anchor 38*b* in a slotted opening in the swash plate 32. Another pullwire 38*a* is sectioned off in FIG. 7. When the pushrod pairs 31*c* & 31*d* and 31*a* & 31*b* as shown FIGS. 6&7 are operated by the actuators 6&8 to push on the swash plate 32, the tilting the swash plate 32 delivers translational movement of the pullwires 62*c* & 62*d* and 62*a* & 62*b*. For example, when the actuator 6 is rotated to cause the pushrod 30c to push against proximal surface 33 of the swash plate 32 and the pushrod 30d to move away from the swash plate 32, as shown in FIG. 6, the pullwire 62c is pushed forward sending a forward translational movement to the proximal end of catheter 26, and the pullwire 62d is pulled backward sending a backward translational movement to the proximal end of the catheter 26.

On the other hand, as shown in FIG. 1, the ICE catheter handle 1 includes a rotation collar 2 that is configured to rotate around the longitudinal axis 70, and is coupled to the internal structure inside cap 10, so that the rotational movement of the rotation collar 2 rotates the remote end of the catheter 26 having an ultrasound array through the pullwires, thus moving the ultrasound array to be oriented in different directions which facilitates generating desired ultrasound images, although this transfer of rotational movement from the rotation collar 2 to the remote end of the catheter 26 may not be as efficient as the transfer of translation movement. One of the advantages of the pushrods and swashplate arrangement is that rotation of the swash plate 32 does not change tilting of the swash plate, since the tilting direction and angle is dependent only on the pushrods 38a-38d and not on the rotation collar 2.

The rounded ends 31a-31d of pushrod 30a-30d shown in FIG. 6 are configured to slide along the proximal surface 33 of the swash plate 32 when the swash plate 32 is pushed by one or two of the pushrods 30a-30d or rotated by turning the rotation collar 2. To help minimize the friction caused by contact with the pushrods 30, the proximal surface 33 of the swash plate 32 can include a low-friction wear-resistant coating (e.g., Teflon®, hard chromium, or another low-frictional coating), allowing the pushrods 30a-d to easily and smoothly glide along the low-friction proximal surface 33 of the swash plate 32. Further improvement can include adding a low-friction wear resistant coating (e.g., Teflon®, hard chromium, or another low-frictional coating) to the rounded ends 31a-31d of the pushrods 30a-30d.

Figure 8:
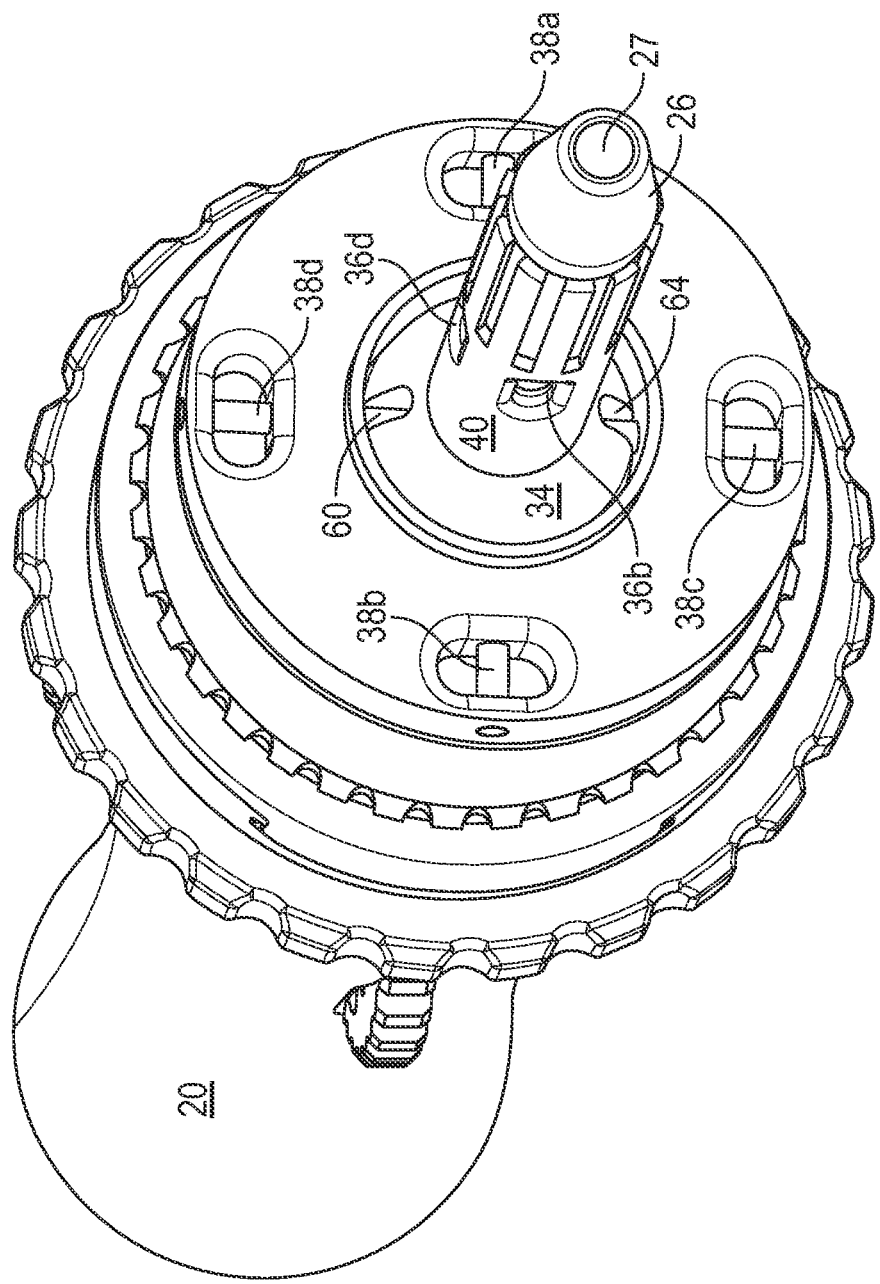
FIG. 8 is a perspective view of an example of an assembly of parts inside a cap portion 10 that illustrates the swash plate 32 includes four pullwire anchors 38a-38d evenly positioned around the swash plate, e.g., circularly positioned at 90° angles from each other.

FIG. 8 is a perspective view of the assembly of parts in FIG. 7 viewed from a different angle to more clearly illustrate the pullwire movement structure. There are two pairs of inline pullwire anchors, 38a & 38b and 38c & 38d, that are arranged orthogonal to each other, and the four anchors are evenly positioned around the swash plate 32, e.g., circularly positioned at 90° angles from each other. The ends of pullwires 62a, 62b, 62d, and 62d (not shown in FIG. 8) are coupled to the pullwire anchors, 38a, 38b, 38c, and 38d, respectively. And the other ends of the pullwires 62a, 62b, 62d, and 62d are threaded through pullwire feedthroughs 36a, 36b, 36c, and 36d, respectively, and into the internal tube 27 of the catheter tube 26 to connect to the di end of the catheter. As illustrated, the pullwire anchors 38c & 38d are part of the round rod 60 which serves the purpose of pivoting the swash plate 32, while the pullwire anchors 38a,38b are individual round rods inserted into holes in the swash plate 32.

Figure 9:
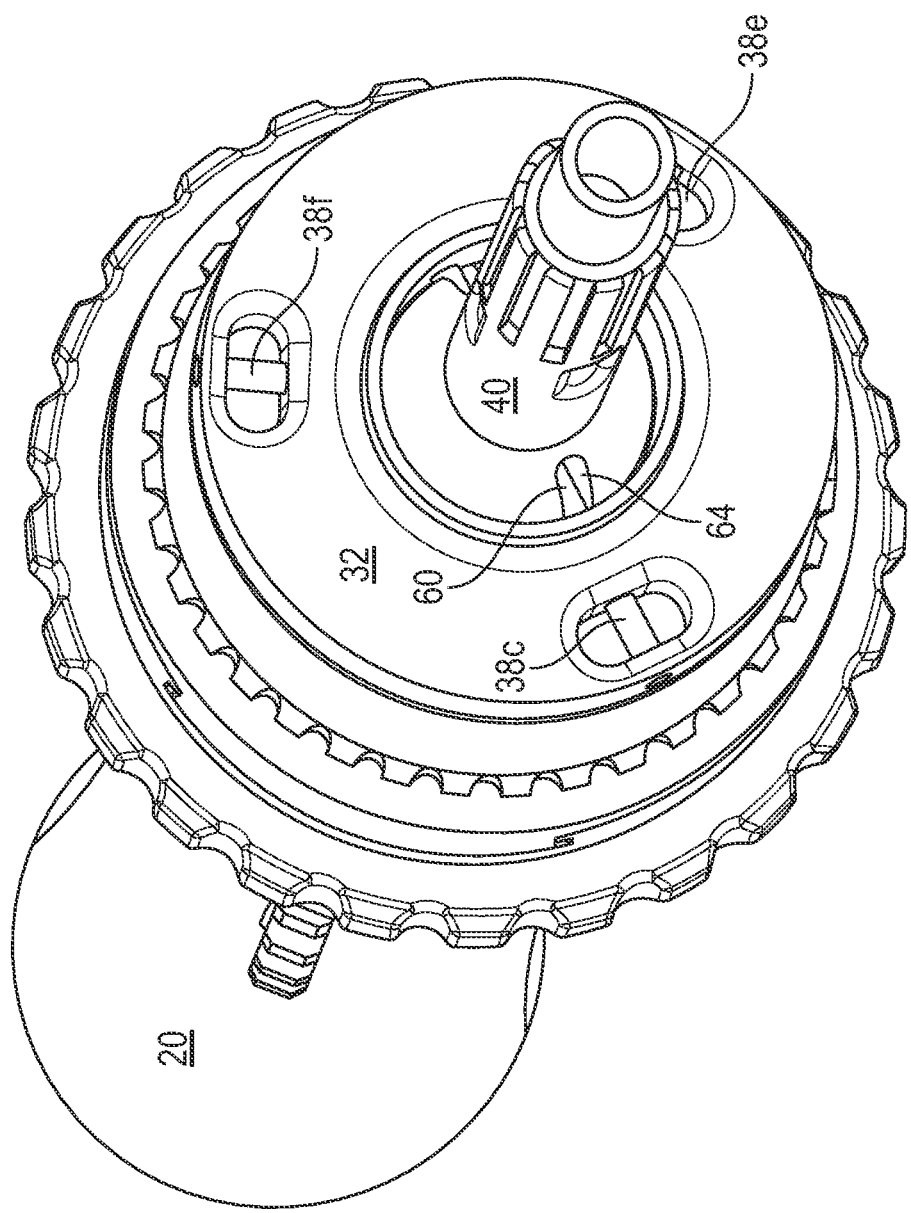
FIG. 9 is a perspective view of an example of an assembly of parts inside a cap portion 10 that illustrates an embodiment where the swash plate 32 includes three pullwire anchors 38c, 38e & 38f evenly positioned around the swash plate, e.g., circularly positioned at 120° angles from each other.

Another embodiment of pullwire implementation is illustrated in FIG. 9. Instead of two pairs of pullwires anchors orthogonally arranged, FIG. 9 shows three pullwire anchors 38c, 38e and 38f evenly positioned around the swash plate 32, e.g., circularly positioned at 120° with one another. Since geometrically 3 points can effectively define a plane, three pullwires connected to their respective pullwire anchors on the swath plate 32 can effectively send plane tilting and rotating signals to the remote end of catheter 26.

Figure 10:
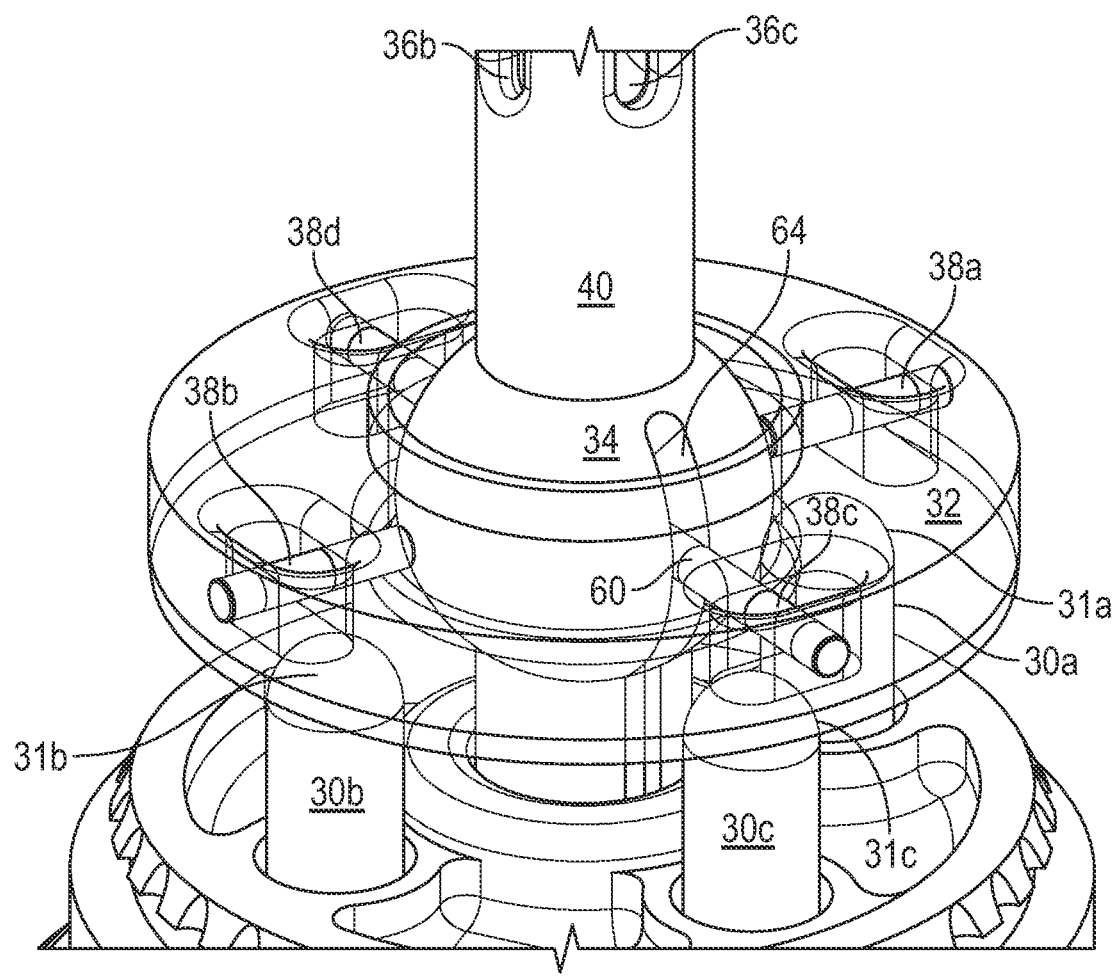
FIG. 10 is a partial transparent view of an example of internal structure of an ICE catheter handle 1, illustrating details of pushrods 38a-38d, a swash plate 32, a pivot 34 that allows the swash plate to pivot in two orthogonal directions, a center tube 40, and pullwire anchors 38a-38d.

FIG. 10 provides a partially transparent perspective view of the assembly of parts of the example illustrated in FIG. 1, including the pushing rods, 30a, 30b, 30c, and 30d, the swash plate 32, the pullwire anchors 38a, 38b, 38c, and 38d, the center tube 40 with the pivot 34, and the pullwire feedthroughs 36b and 36c on the center tube 40. It can be seen clearly that the round rod 60 is coupled with the pivot 34 of the tube 40 through a slotted channel 64, and the swash plate 32 has a rounded hole at its center for the coupling with the pivot 34. Other embodiments can have different types of pivoting mechanisms for tilting the swash plane 32. It is within the scope of the present invention if orthogonal forces or moments are involved to deliver movements to the remote end of the catheter.

Tilting of the swash plate 32 can be determined by different arrangements of pushrods, for example, four pushrods 30a-30d, as illustrated in FIGS. 5-7, two positioned in each of the planes 72&74 as a pair. Some other embodiments may include three pushrods to cause orthogonal tilting of the swash plate 32. In some embodiments, the first and second actuators 6&8 are controls that are electrically coupled to orthogonally steer the catheter. In some embodiments the two actuators may be located at different locations on the handle end 20, including the proximal end 21, the distal end 22, and the middle portion between the proximal end 21 and the distal end 22, or on one side, or on different sides. In some embodiments, each of the orthogonally aligned actuators is a rotatable dials that are mechanically coupled to the pushrods, and move the pushrods toward the swashplate when they are rotated in a first direction and away from the swashplate when they are rotated in a second direction, opposite the first direction. In such embodiments, the actuators can be coupled to the pushrod by one or more gears that translate the rotational motion of the actuator to a longitudinal motion of the pushrod (e.g., similar to a mechanism used in a stepper motor system). In some embodiments, the movement of the actuators can control a stepper motor that moves the pushrod towards and away from the swashplate (depending on the movement of the actuator) in a longitudinal direction. Use of a stepper motor may control the speed of the movement of pushrod and correspondingly the steering movement of end of the catheter, allowing very fine movements to be made with precision. In some embodiments with stepper motors. In various embodiments, the movement of the pushrods 30a-30d may be controlled via the actuators along with a number of other mechanisms, for example, rack and pinion gear drives, or pin and slot joints, and the like.

Figure 11:
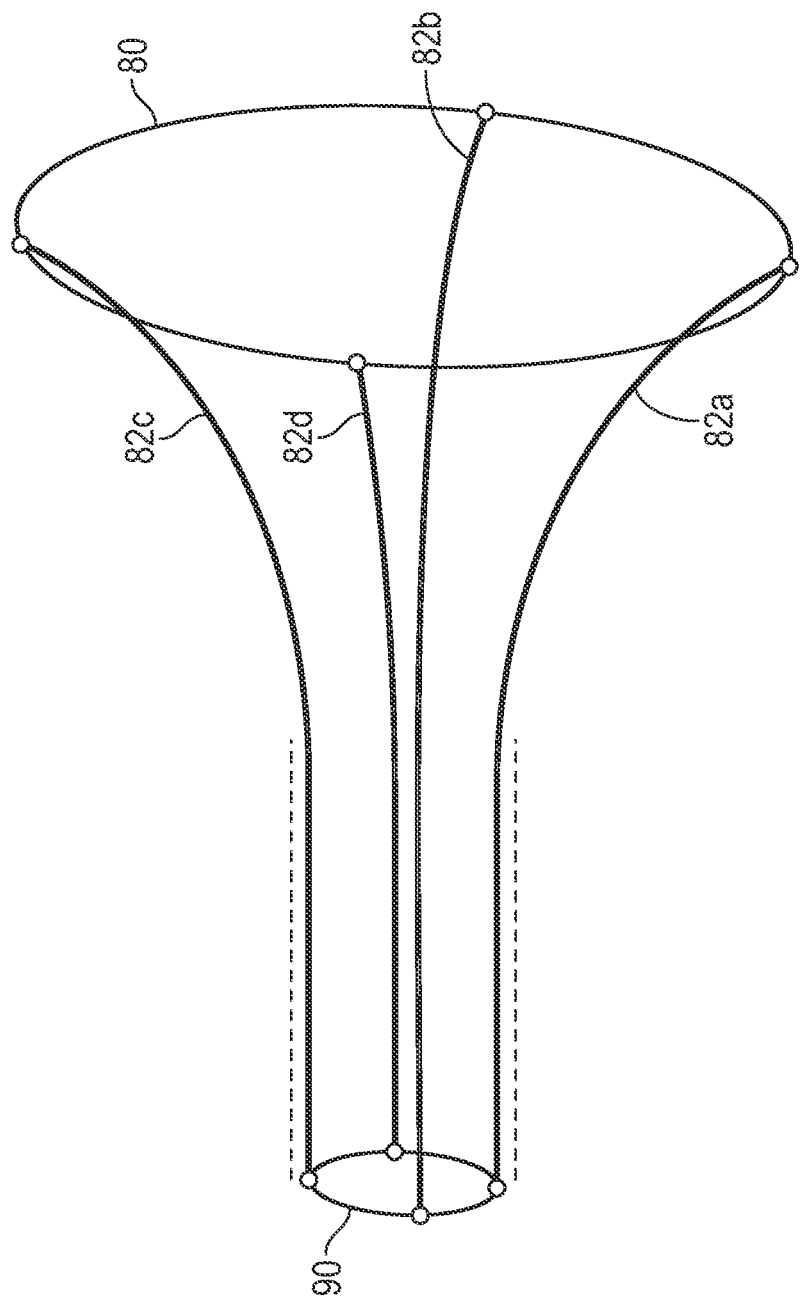
FIG. 11 is a diagram illustrating an example of wires that can be used to control the shape of bend of a catheter.

FIG. 11 is a diagram illustrating an example of wires that can be used to transfer the movement of the swash plate 32 to the remote end of the catheter 26 connected to the proximal end of cap 10. A swash plate ring 80 represents the ring on the swash plate 32 formed by the pullwire anchors 38a-38d, and the wires 82a-82d represents the pullwires 62a-62d. At the remote end of catheter 26 where an ultrasound array is located to take images, the wires 82a-82d are connected to form a smaller catheter ring 90. In such a way the relationship for movement transfer from the swash plate ring 80 to the catheter ring 90 is established.

Figure 12:
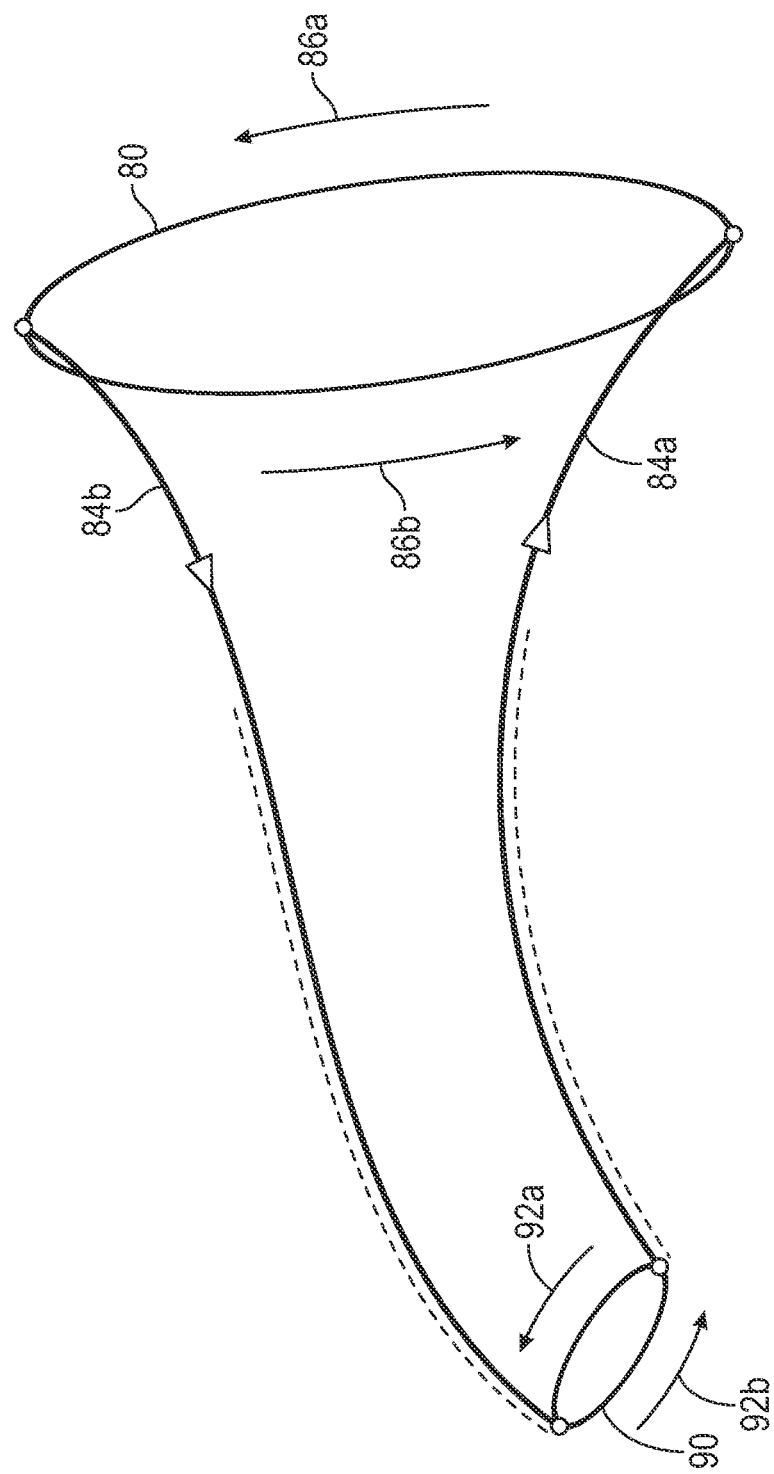
FIG. 12 is a diagram illustrating an example of wires that can be used to control the shape of bend of a catheter.

This movement transfer is made more apparent in FIG. 12, which is another representing diagram. As discussed previously, the swash plate 32 has two types of movements, the tilting caused by the pushrods 30a-30d, and the rotation caused by rotating the rotation collar 2. As discussed with FIG. 67, the tilting movement of the swash plate ring 80 causes one of the paired pullwire to move forward and the other one to move backward. This movement is presented by the forward movement of 84b and the backward movement of 84a illustrated in FIG. 12. And this tilting movement is transferred to the catheter ring 90, causing the ring to tilt.

Because the catheter ring 90 is smaller than the swash plate ring 80, the tilting angle of the catheter ring 90 is larger than the tilting angle of the swash plate 80, a magnification effect. In general, the increase of the tilt angle from the swash plate ring 80 to the catheter ring 90 is proportional to the ratio of the diameter of the swash plate ring 80 to the diameter of the catheter ring 90. Since the catheter tip can be make quite small as compared to the catheter handle, this magnification effect can be quite large. This tilting causes the catheter ring to bend over. In this way, at the proximal end 41 of the catheter 26, the bending allows the ultrasound array to change direction. In FIGS. 12, 86a & 86b represent rotational movement of the swash plate 32 in the cap 10 when the rotation collar 2 is rotated. The rotational movement 86a & 86b of the swash plate 32 is transferred to the catheter ring 90 as rotation 92a & 92b. In general, the rotational movement has a loss depending on the length of the catheter and the rigidity of the wires used. This means that the magnification effect of the rotational movement is always less than 1. The controlled translation movement and the rotational movement of the remote (or proximal) catheter tip allows catheter bending and steering to enter different locations and to aim the ultrasound array to different directions to take ICE images.

Figure 13:
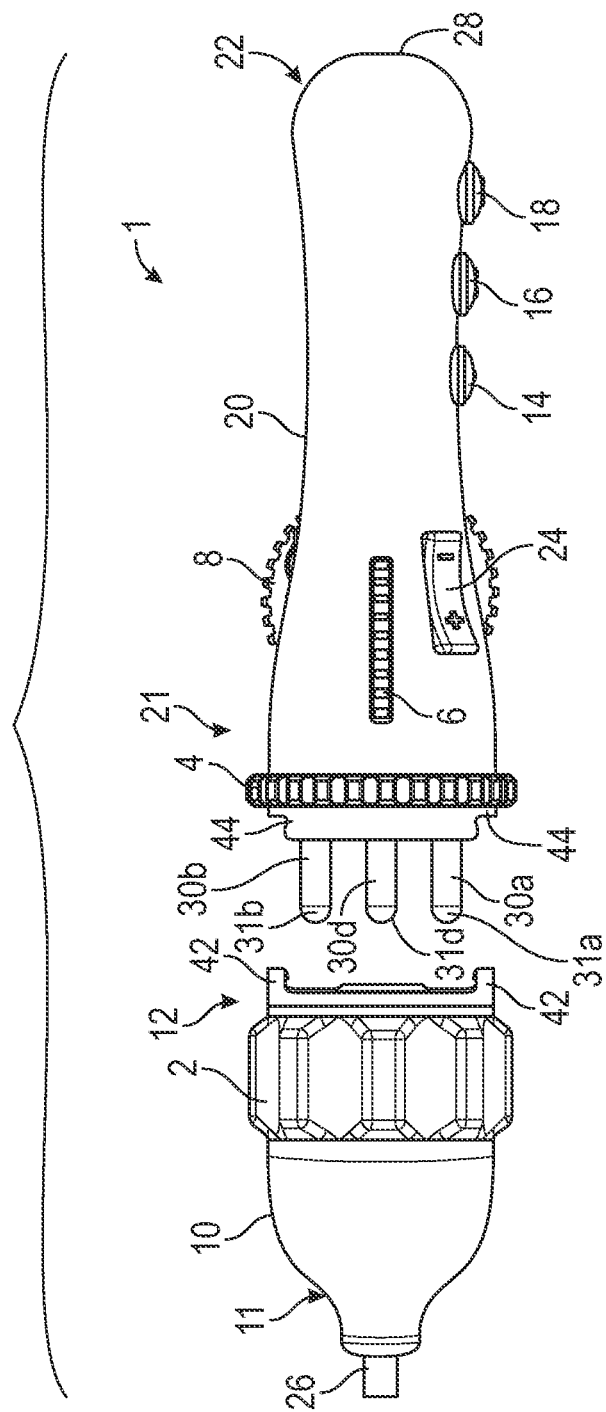
FIG. 13 is a side view of an example of an ICE catheter handle 1 that has a cap 10 and a handle end 20 that can be coupled together for use, and then the cap portion 10 can be separated from the handle portion 20, e.g., for disposal.

As shown FIG. 13, a plan view of an example embodiment of the catheter handle 1 of FIG. 1, the cap 10 may be removably coupled to the handle end 20 such that the cap 10 can be easily separated from, and coupled to, the handle end 20. The handle end 20 includes the locking ring 4 which is configured to rotate around the longitudinal axis 70 to realize locking the handle end 20 with the cap 10. The locking mechanism includes locking edges 40 on the cap 10 and locking recesses 44 on the handle end 20. When the handle end 20 is put together with the cap 10, the locking ring 4 is rotate to engage the locking edges 42 with the locking recesses 44, so that the handle end 20 is firmly connected to the cap 10. To disconnect the handle end 20 from the cap 10, the locking ring 4 is rotated to disengage the locking edge 42 and locking recesses 44.

In this example, the handle end 20 also includes control buttons 14, 16, and 18, as shown in FIG. 1, that can be used to control various functions of the catheter, including imaging functions. In some embodiments, control buttons 14, 16, and 18 are programmable. The handle end 20 also includes an imaging control rocker switch 24 that controls a zoom feature of an ultrasound array on the catheter. The handle end 20 further includes a connection port 28 to connect the handle end 20, and the catheter attached to the handle end 20, to processing equipment, for example, image processing equipment to process and display ultrasound information generated by the catheter.

Figure 14:
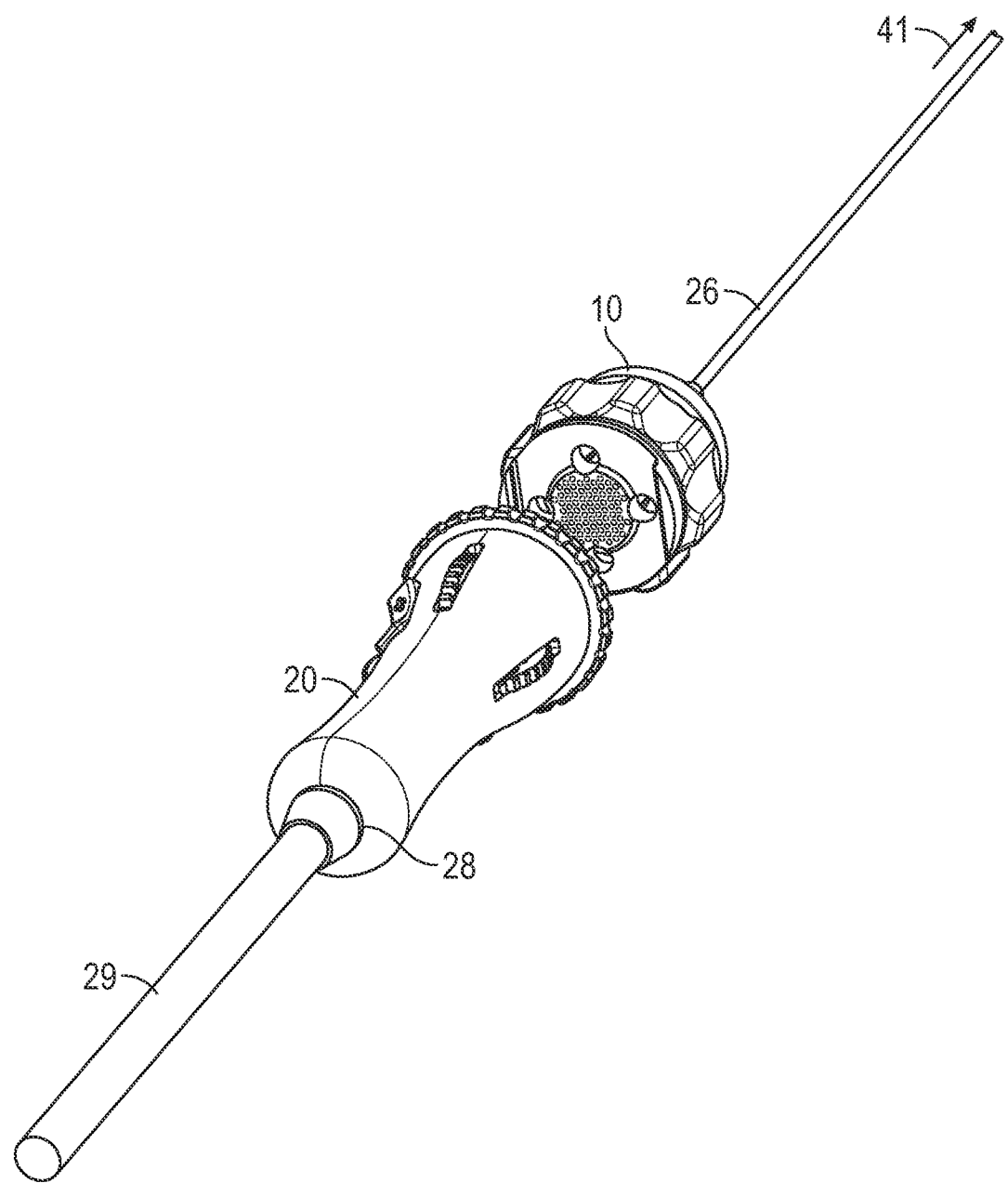
FIG. 14 is a perspective view of an example of an ICE catheter handle 1 that has a cap 10 and a handle end 20 that can be coupled together for use, and then the cap portion can be separated from the handle portion, and illustrates the connection of the catheter tube 26 to the proximal end of the handle.

FIG. 14 is a perspective view of an example of an ICE catheter handle 1 with the cap 10 and the handle end 20 separated like in FIG. 13 discussed above. In FIG. 14, arrow 41 indicates the proximal end 41 of the catheter 26. In an example, the length of the ICE catheter 26 is between about 90 cm to 110 cm long. But the length may be dependent on different factors, e.g., age and gender of the patent, use (entry point into patient) can vary.

Figure 15:
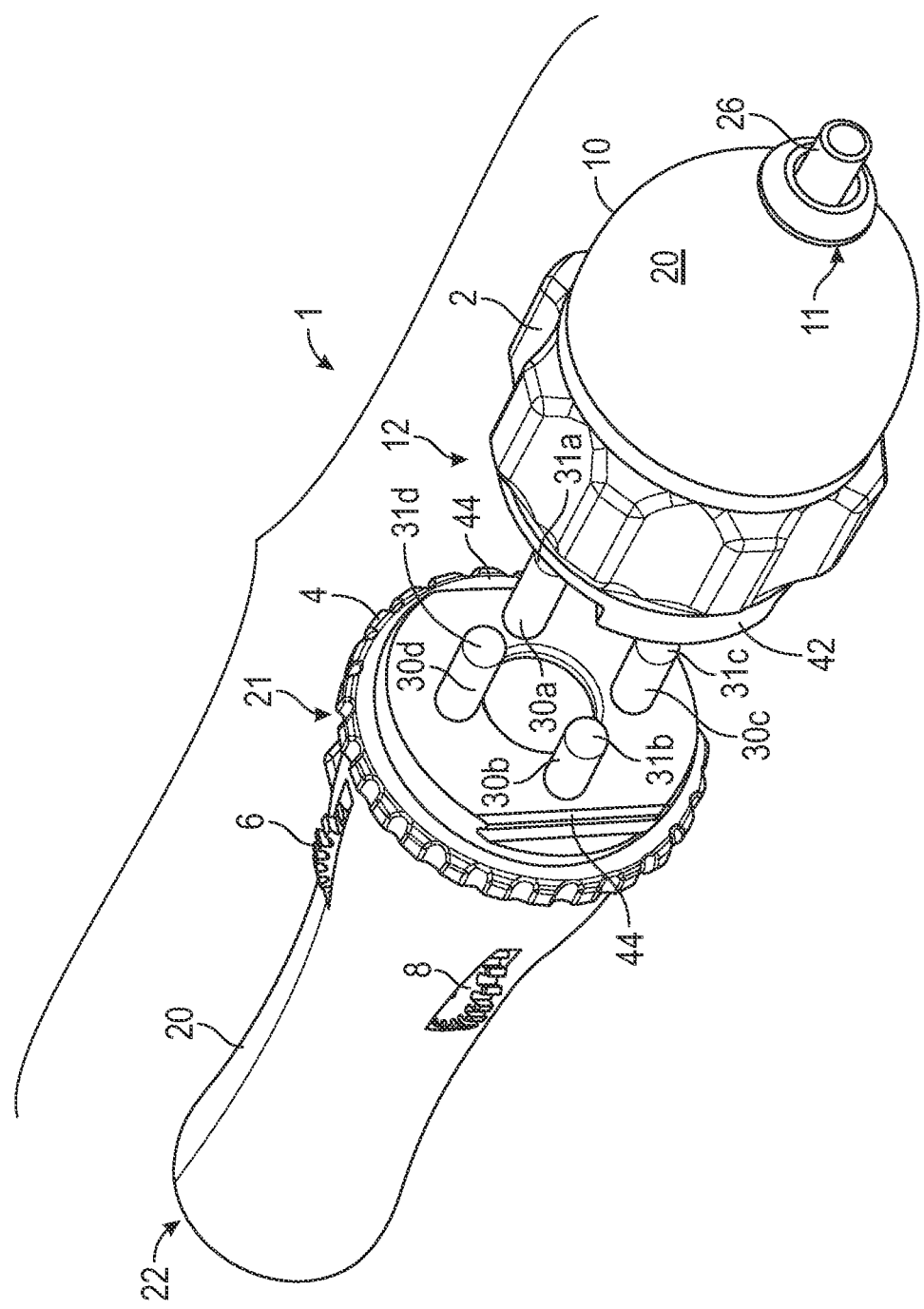
FIG. 15 is a perspective view of the ICE catheter handle 1 shown in FIG. 5.

FIG. 15 is another perspective view of the catheter handle 1 with the cap 10 and the handle end 20 separated, where a locking recess is clearly shown.

Figure 16:
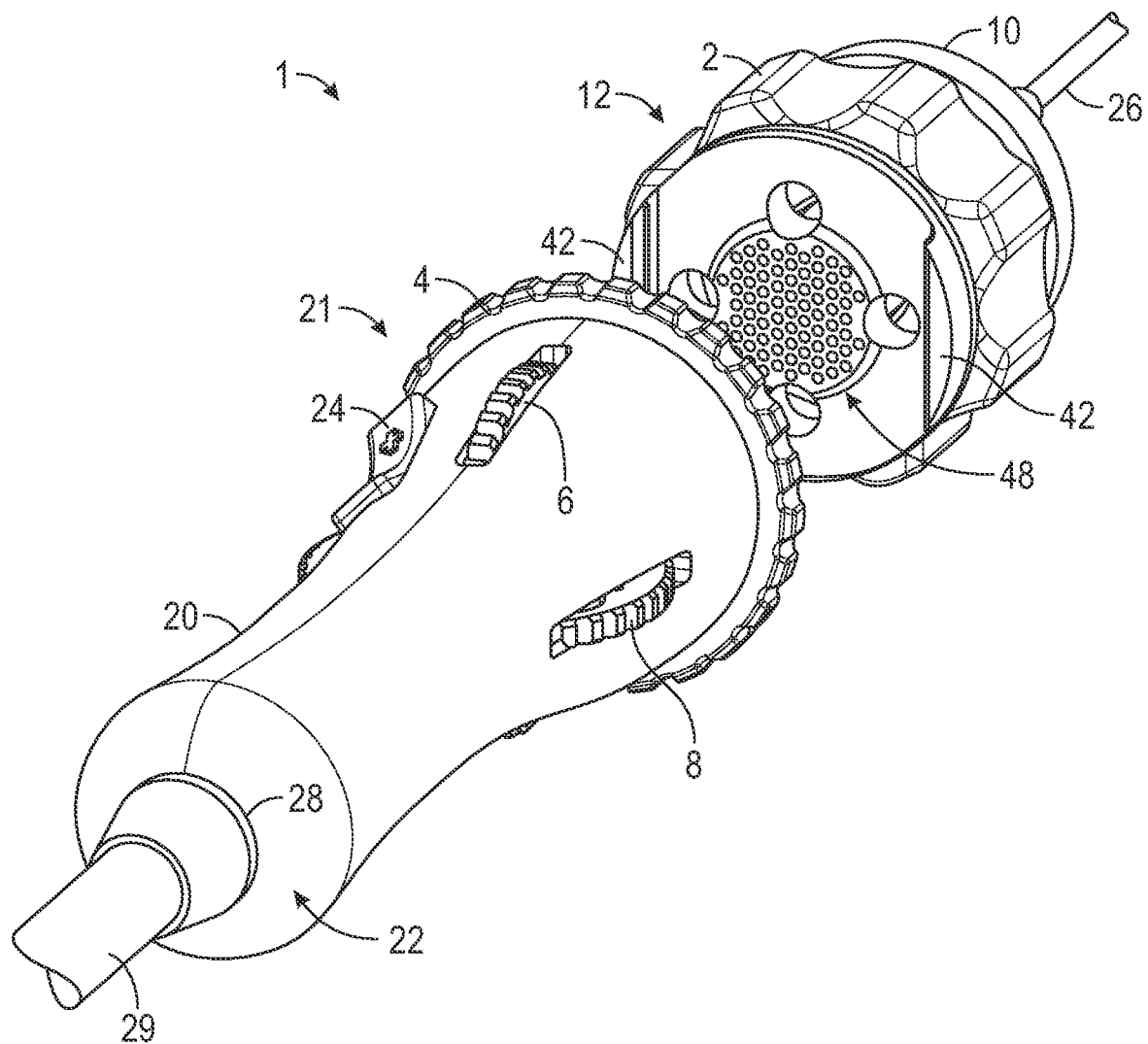
FIG. 16 is a perspective view of the example of an ICE catheter handle 1 shown in FIG. 14 illustrated to show details of its features, including the female electrical interface at the distal end of the cap 10.
Figure 17:
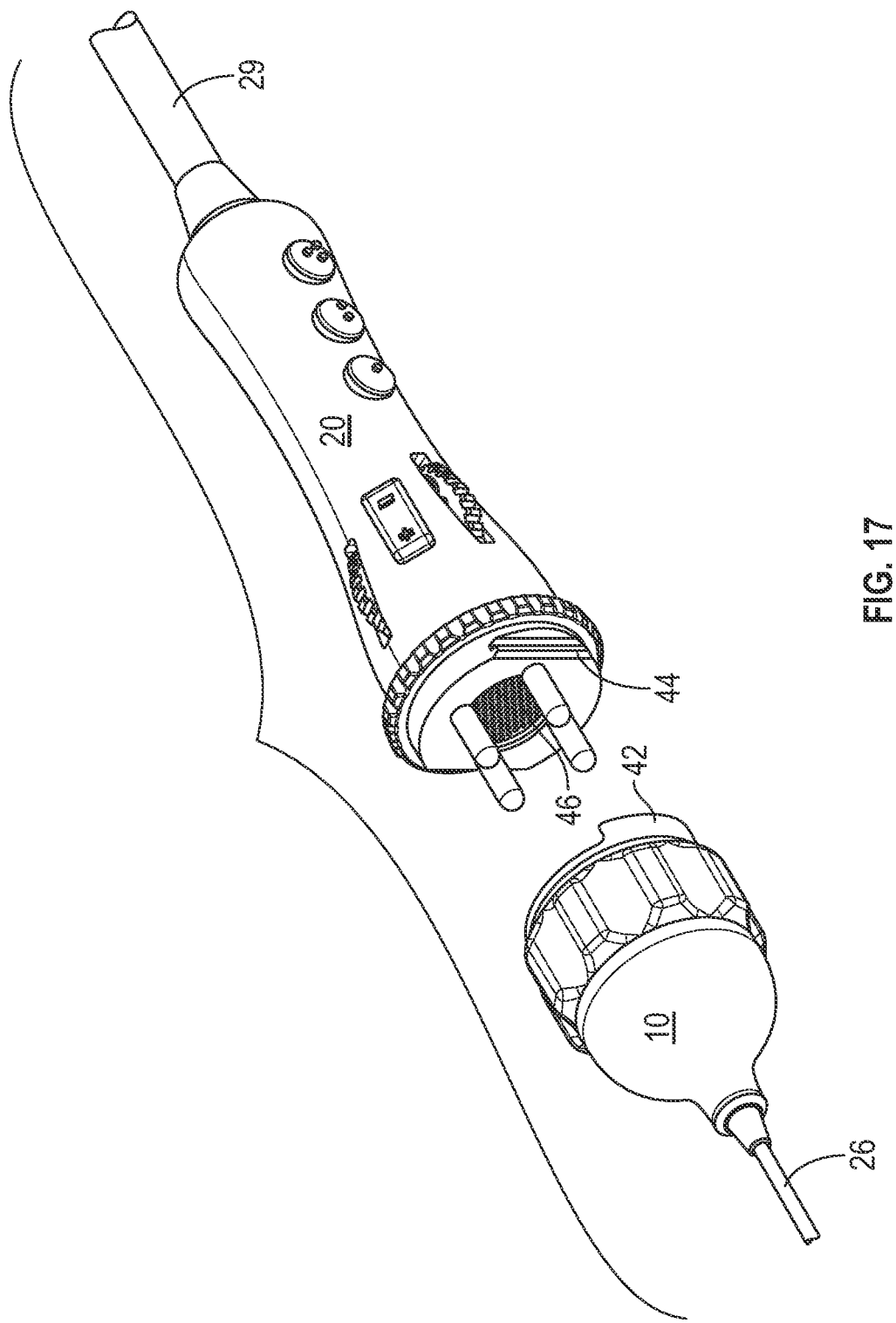
FIG. 17 is another perspective view of the example of the ICE catheter handle shown in FIG. 14 showing the male electrical interface of the proximal end 21 of the handle end 20.

FIGS. 16&17 are also perspective views of the catheter handle 1 from different directions, with the cap 10 and the handle end 20 separated. Electrical interfaces between the cap 10 and the handle 20 are cleared presented in these two figures, including the female electrical interface 48 at the distal end 12 of the cap 10 and the male electrical interface 46 at the proximal end 21 of the handle portion 20. The electrical interfaces 46&48 are configured to provide electrical signals and information to and from the ultrasound array at the remote end of the catheter 26.

EXAMPLE EMBODIMENTS

Examples of Embodiments Relating to Controlling an ICE Catheter Handle Having Orthogonal-Aligned Catheter Controls for Use in Intra Cardiac Echocardiography.

The following are non-limiting examples of certain embodiments of systems and methods relating to controlling an ICE catheter handle having orthogonal-aligned catheter controls for use in intra cardiac echocardiography. Other embodiments may include one or more other features, or different features, which are discussed herein.

Embodiment 1: An intra-cardiac echocardiography ("ICE") catheter handle, comprising: a housing having a longitudinal axis, the housing having a proximal end and a distal end; a first actuator coupled to a first controller, the first actuator configured to move in a first plane and in a direction along the longitudinal axis to control a catheter, coupled to the housing, to move in a first direction and a second direction, the first direction being opposite to the second direction; and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane.

Embodiment 2: The ICE catheter handle of embodiment 1, wherein the first actuator and the second actuator extend outside of the housing.

Embodiment 3: The ICE catheter handle of embodiment 1, wherein the housing includes an elongated first aperture aligned parallel to the longitudinal axis, the first controller positioned within the housing and coupled to the first actuator within the housing, and the first actuator extends through the first aperture; and wherein the housing includes an elongated second aperture aligned parallel to the longitudinal axis, the second controller positioned within the housing and coupled to the second actuator within the house, and the second actuator extends through the second aperture.

Embodiment 4: The ICE catheter handle of embodiment 1, wherein the first controller is configured such that movement of the first actuator translates to a corresponding first and second movement of a catheter coupled to the housing, and wherein the second controller is configured such that the movement of the second actuator translates to a corresponding third and fourth movement of a catheter coupled to the housing, wherein the movement of the first actuator and the corresponding first and second movement of the catheter are aligned in the first plane, and wherein the movement of the second actuator corresponding third and fourth movement of the catheter are aligned in the second plane.

Embodiment 5: The ICE catheter handle of embodiment 1, wherein the housing includes an elongated first aperture and an elongated second aperture, both the first and second aperture aligned parallel to the longitudinal axis and positioned on opposite sides of the housing, the first controller positioned within the housing and coupled to the first actuator within the housing, and a portion of the first actuator extends through the first aperture and extends through the second aperture; and wherein the housing includes an elongated third and an elongated fourth aperture, both the first and second aperture aligned parallel to the longitudinal axis and positioned on opposite sides of the housing, the second controller positioned within the housing and coupled to the second actuator within the housing, and a portion of the second actuator extends to the third aperture and extends through the fourth aperture.

Embodiment 6: The ICE catheter handle of embodiment 5, wherein the first actuator comprises a single structure which extends through the first and second apertures.

Embodiment 7: The ICE catheter handle of embodiment 6, wherein the second actuator comprises a single structure which extends through the third and fourth apertures.

Embodiment 8: The ICE catheter of embodiments 6 or 7, wherein the first actuator is substantially I-shaped.

Embodiment 9: The ICE catheter of embodiments 8, wherein the second actuator is substantially I-shaped.

Embodiment 10: The ICE catheter of embodiment 1, wherein the first actuator is coupled to a first pivot structure and configured to rotate around the first pivot structure, and the second actuator is coupled to a second pivot structure configured to rotate around the second pivot structure.

Embodiment 11: The ICE catheter of embodiment 1, wherein the first controller comprises at least one pushrod and the first actuator is coupled to the at least one pushrod of the first controller, and wherein the second controller comprises at least one pushrod and the second actuator is coupled to the at least one pushrod of the second controller.

Embodiment 12: The ICE catheter of embodiment 1, further comprising the catheter coupled to the housing.

Embodiment 13: An intra-cardiac echocardiography ("ICE") catheter, comprising: a catheter handle, comprising a housing having a longitudinal axis, the housing having a proximal end and a distal end, a first actuator coupled to a first controller, the first actuator configured to move in a first plane and in a direction along the longitudinal axis to control a catheter, coupled to the housing, to move in a first direction and a second direction, the first direction being opposite to the second direction, and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane; and an ICE catheter coupled to the catheter handle.

Embodiment 14: A method of steering of intra-cardiac echocardiography ("ICE") catheter, the method comprising: providing an ICE catheter handle coupled to an ICE catheter, the ICE catheter handle having a housing having a longitudinal axis, the housing having a proximal end and a distal end, a first actuator coupled to a first controller, the first actuator configured to move in a first plane and in a direction along the longitudinal axis to control a catheter, coupled to the housing, to move in a first direction and a second direction, the first direction being opposite to the second direction, and a second actuator coupled to a second controller, the second actuator configured to move in a second plane and in a direction along the longitudinal axis to control a catheter, coupled to the housing, to move in third direction and a fourth direction, the third direction being opposite to the fourth direction, wherein the first plane is aligned orthogonally to the second plane; moving the first actuator within the first plane to move a proximal end of the catheter in the first direction; and moving the second actuator within the second plane to move the proximal end of the catheter in the second first direction.

Embodiment 15: An intra-cardiac echocardiography ("ICE") catheter handle, comprising: a housing having a longitudinal axis, the housing having a proximal end and a distal end; a first actuator coupled for controlling movement of a tip of a catheter coupled to the housing in a first direction and a second direction, the first direction opposite the second direction and substantially in a first plane, wherein the location of the first actuator on the housing is substantially within the first plane; and a second actuator coupled for controlling movement of the tip of a catheter coupled to the housing in a third direction and a fourth direction, the third direction opposite the fourth direction and substantially in a second plane, wherein the location of the second actuator on the housing is substantially within the second plane.

Embodiment 16: The ICE catheter handle of embodiment 15, wherein the first and second plane are orthogonally aligned.

Embodiment 17: The ICE catheter handle of embodiment 15, wherein the first and second plane are aligned orthogonally within plus or minus 5 degrees.

Embodiment 18: The ICE catheter handle of embodiment 15, wherein the first and second plane are aligned orthogonally within plus or minus 10 degrees.

Embodiment 19: The ICE catheter handle of embodiment 15, wherein the first and second plane are aligned orthogonally within plus or minus 15 degrees.

Embodiment 20: The ICE catheter handle of embodiment 15, wherein the first and second plane are aligned orthogonally within plus or minus 20 degrees.

Embodiment 21: The ICE catheter handle of embodiment 15, wherein the first and second plane are aligned orthogonally within plus or minus 25 degrees.

Embodiment 22: An intra-cardiac echocardiography ("ICE") catheter handle, comprising: a housing having a longitudinal axis and having a vertical and horizontal orientation; a posterior/anterior steering control is positioned along the vertical orientation of the handle, the posterior/anterior steering control actuatable to control movement of a proximal portion of the catheter in a posterior and anterior direction; a left/right steering control positioned along the horizontal orientation of the handle, the left/right steering control actuatable to control movement of the proximal portion of the catheter in a left or right direction.

Examples of Embodiments Relating to an ICE Catheter Handle Having a Cap/Catheter Portion and that is Separable from a Handle Assembly The following are non-limiting examples of certain embodiments of systems and methods relating to relating to a separable ICE catheter and handle assembly for use in intra cardiac echocardiography. Other embodiments may include one or more other features, or different features, which are discussed herein.

Embodiment 1: An intra-cardiac echocardiography (ICE" catheter handle, comprising: a cap including a catheter on a proximal end and a first interface on a distal end; and a handle assembly having a proximal end and a distal end, the proximal end having a second interface that can be removably coupled to the first interface of the cap, wherein the first and second interface are configured to be releasably coupled together and to communicate electrical signals between the handle assembly and the catheter.

Embodiment 2: The ICE catheter handle of embodiment 1, wherein the cap includes a rotation collar coupled to the catheter, the rotation collar configured to rotate the catheter when the rotation collar is rotated.

Embodiment 3: The ICE catheter handle of embodiment 2, wherein the rotation collar is coupled to a center tube of the catheter.

Embodiment 4: The ICE catheter handle of embodiment 2, wherein the rotation collar is coupled to pull wires of the catheter.

Embodiment 5: The ICE catheter handle of embodiment 2, wherein the rotation collar is coupled to the catheter and configured such that rotation of the rotation collar in a first direction correspondingly rotates the catheter in the first direction.

Embodiment 6: The ICE catheter handle of embodiment 1, wherein cap is releasably coupled to the handle assembly one or more extended members on the cap that fit into corresponding one or more recesses on the handle.

Embodiment 7: The ICE catheter handle of embodiment 1, wherein cap is releasably coupled to the handle assembly by one or more extended members on one of the first and second interface that fit into corresponding recesses on the other of the first and second recesses.

Embodiment 8: The ICE catheter handle of embodiment 1, wherein the first and second interface interact to communicate catheter steering controls between the handle assembly and the catheter.

Embodiment 9: The ICE catheter handle of embodiment 1, wherein the first and second interface each comprise a plurality of corresponding electrical connections to communicate ultrasound control signals between the handle assembly and the catheter.

Embodiment 10: The ICE catheter handle of embodiment 1, wherein the first and second interface each comprise a plurality of corresponding electrical connections to communicate ultrasound image information between the catheter and the handle assembly.

Embodiment 11: The ICE catheter handle of embodiment 1, wherein the handle assembly further comprises a connector to communicate electrical signals between the handle assembly and another computer system.

Embodiment 12: The ICE catheter handle of embodiment 1, wherein the handle assembly comprises steering controls.

Embodiment 13: The ICE catheter handle of embodiment 1, wherein the handle assembly comprises one or more ultrasound imaging controls.

Embodiment 14: The ICE catheter handle of embodiment 1, wherein the handle assembly is sterilizable.

Embodiment 15: The ICE catheter handle of embodiment 1, wherein the cap includes a pivotable swash plate having anchor points for pullwires of the catheter, and wherein the handle assembly includes pushrods movable by controls on the handle assembly, the cap and handle assembly configured such that when the cap is coupled to the handle assembly, the pushrods contacting the swash plate to move the swash plate and correspondingly move the pullwires to steer the catheter.

Examples of Embodiments Relating to an ICE Catheter Handle Having Orthogonal-Aligned Catheter Controls for Use in Intra Cardiac Echocardiography.

The following are non-limiting examples of certain embodiments of systems and methods relating to controlling an ICE catheter handle having orthogonal-aligned catheter controls for use in intra cardiac echocardiography. Other embodiments may include one or more other features, or different features, which are discussed herein.

Embodiment 1: An intra-cardiac echocardiography ("ICE") catheter handle assembly, comprising: a swash plate having a distal surface and a plurality of anchor points configured to attach pullwires of a catheter; a pivot mechanism coupled to the swash plate and configured to rotate about a point in two orthogonal directions; a plurality of pushrods, each pushrod having a proximal end and a distal end, the proximal end positioned to contact the distal surface of the swash plate; a first actuator and a second actuator, each of the first and second actuators coupled to at least one pushrod, the first and second actuators configured to move along a longitudinal direction of the handle assembly in a first and second direction, respectively, wherein the movement of the actuators correspondingly moves the plurality of pushrods to tilt the swash plate in the first and second directions.

Embodiment 2: The ICE catheter handle assembly of embodiment 1, wherein the plurality of pushrods comprises four pushrods.

Embodiment 3: The ICE catheter handle assembly of embodiment 1, wherein the swash plate comprises four anchor points.

Embodiment 4: The ICE catheter handle assembly of embodiment 1, wherein the swash plate comprises three or more anchor points.

Embodiment 5: The ICE catheter handle assembly of embodiment 1, wherein the two actuators are aligned orthogonally.

Embodiment 6: The ICE catheter handle assembly of embodiment 1, further comprising a housing enclosing the swash plate, the pivot mechanism, the plurality of pushrods, and at least a portion of the two actuators, wherein the two actuators extend through the housing.

Embodiment 7: The ICE catheter handle assembly of embodiment 6, wherein the two actuators are aligned orthogonally, and each extend through the housing on opposite sides of the housing.

Embodiment 8: The ICE catheter handle assembly of embodiment 1, further comprising a cap portion and a handle portion, wherein the cap portion comprises the swash plate and the pivot mechanism, and the handle portion comprises the pushrods and the actuators.

Embodiment 9: The ICE catheter handle assembly of embodiment 8, wherein the cap comprises a rotational collar.

Embodiment 10: The ICE catheter handle assembly of embodiment 8, wherein the handle portion comprises a locking ring configured to, when tightened, lock the rotation collar into a set position.

Embodiment 11: An intra-cardiac echocardiography ("ICE") catheter handle assembly, comprising: a structure having a plurality of anchor points configured to attach to pullwires of a catheter; a pivot mechanism coupled to the structure and configured to rotate the structure about a point in two orthogonal directions; a plurality of pushrods, each pushrod having a proximal end and a distal end, the proximal end positioned to contact the structure; a first actuator and a second actuator, each of the first and second actuators coupled to at least one pushrod, the first and second actuators configured to move along a longitudinal direction of the handle assembly in a first and second direction, respectively, wherein the movement of the actuators correspondingly moves the plurality of pushrods to tilt the structure in the first and second directions.

Embodiment 12: The ICE catheter handle assembly of embodiment 9, wherein the structure comprises a surface positioned towards the pushrods and configured to contact the pushrods.

Embodiment 13: The ICE catheter handle assembly of embodiment 10, further comprising a rotation collar coupled to the structure, the rotation collar and the structure configured to rotate correspondingly.

Implementation Consideration

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward," "rearward," "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. An intracardiac echocardiography ("ICE") catheter handle, comprising:
    a housing having a longitudinal axis, the housing having a proximal end and a distal end;
    a first actuator extending through the housing, the first actuator coupled to a first controller, the first actuator and first controller configured to control moving a catheter, that is removably coupled to the handle with a locking mechanism, in a first direction and a second direction in a first plane aligned with the longitudinal axis; and
    a second actuator extending through the housing, the second actuator coupled to a second controller, the second actuator and second controller configured to control moving the catheter, that is removably coupled to the handle, in a third direction and a fourth direction in a second plane aligned with the longitudinal axis, wherein the first plane is aligned orthogonally to the second plane.

2. The ICE catheter handle of claim 1,
    wherein the housing includes an elongated first aperture aligned parallel to the longitudinal axis, the first controller positioned within the housing and coupled to the first actuator within the housing, and the first actuator extends through the first aperture; and
    wherein the housing includes an elongated second aperture aligned parallel to the longitudinal axis, the second controller positioned within the housing and coupled to the second actuator within the house, and the second actuator extends through the second aperture.

3. The ICE catheter handle of claim 1, wherein the first controller is configured such that movement of the first actuator translates to a corresponding first and second movement of the catheter coupled to the housing, and wherein the second controller is configured such that the movement of the second actuator translates to a corresponding third and fourth movement of the catheter coupled to the housing, wherein the movement of the first actuator and the corresponding first and second movement of the catheter are aligned in the first plane, and wherein the movement of the second actuator and the corresponding third and fourth movement of the catheter are aligned in the second plane.

4. The ICE catheter handle of claim 1,
    wherein the housing includes an elongated first aperture and an elongated second aperture, both the first and second aperture aligned parallel to the longitudinal axis and positioned on opposite sides of the housing, the first controller positioned within the housing and coupled to the first actuator within the housing, and a portion of the first actuator extends through the first aperture and extends through the second aperture; and
    wherein the housing includes an elongated third aperture and an elongated fourth aperture, both the third and fourth aperture aligned parallel to the longitudinal axis and positioned on opposite sides of the housing, the second controller positioned within the housing and coupled to the second actuator within the housing, and a portion of the second actuator extends through the third aperture and extends through the fourth aperture.

5. The ICE catheter handle of claim 4, wherein the first actuator comprises a single structure which extends through the first and second apertures, and the second actuator comprises a single structure which extends through the third and fourth apertures.

6. The ICE catheter handle of claim 1, wherein the first actuator is coupled to a first pivot structure and configured to rotate around the first pivot structure, and the second actuator is coupled to a second pivot structure and configured to rotate around the second pivot structure.

7. The ICE catheter handle of claim 1, wherein the first controller comprises at least one pushrod and the first actuator is coupled to the at least one pushrod of the first controller, and wherein the second controller comprises at least one pushrod and the second actuator is coupled to the at least one pushrod of the second controller.

8. The ICE catheter handle of claim 1, further comprising the catheter, wherein the catheter is removably coupled to the housing using the locking mechanism.

9. An intra-cardiac echocardiography ("ICE") catheter handle, comprising:
   a housing having a longitudinal axis, the housing having a proximal end and a distal end;
   a first actuator coupled for controlling the movement of a tip of a catheter, removably coupled to the housing by a locking mechanism, in a first direction and a second direction in a first plane, the first direction opposite the second direction, wherein the location of the first actuator on the housing is substantially within the first plane; and
   a second actuator coupled for controlling the movement of the tip of the catheter removably coupled to the housing by a locking mechanism in a third direction and a fourth direction in a second plane, the third direction opposite the fourth direction, wherein the location of the second actuator on the housing is substantially within the second plane.

10. The ICE catheter handle of claim 9, wherein the first and second plane are orthogonally aligned.

11. The ICE catheter handle of claim 9, wherein the first and second plane are aligned orthogonally within plus or minus 10 degrees.

12. An intra-cardiac echocardiography ("ICE") catheter system, comprising:
   a catheter having a proximal end and a distal end, the catheter including a catheter tip on the proximal end of the catheter, the catheter tip capable of bending;
   a catheter cap, located at the catheter distal end and coupled to the catheter, having a longitudinal axis, the catheter cap configured to be coupled to a catheter handle having a longitudinal axis, the longitudinal axis of the handle coinciding with the longitudinal axis of the catheter cap when the catheter cap is coupled to the catheter handle;
   a swash plate coupled to the catheter cap, the swash plate configured to tilt;
   a plurality of pullwires, each of the pullwires coupled to the swash plate at the distal end of the catheter and coupled to the catheter tip at the proximal end of the catheter; and
   wherein tilting the swash plate causes the plurality of pullwires to transfer movement of the swash plate to bend the catheter tip.

13. The ICE catheter system of claim 12, wherein the swash plate is coupled to a pivot tip that is connected to the catheter cap.

14. The ICE catheter system of claim 13, wherein the swash plate is configured to tilt about the pivot tip in different directions.

15. The ICE catheter system of claim 12, wherein the plurality of pullwires comprise four pullwires.

16. The ICE catheter system of claim 12, wherein the plurality of pullwires are coupled to the edge of the swash plate and the coupling points are evenly positioned around the edge of the swash plate.

17. The ICE catheter of system claim 12, wherein the coupling of the catheter cap and the catheter handle allows the rotational movement of the catheter handle be transferred to the catheter tip.

18. The ICE catheter system of claim 12, further comprising the catheter handle, wherein the catheter handle includes
   a housing having a proximal end and a distal end, wherein the catheter cap is removably couplable to the proximal end of the housing;
   a first actuator coupled to the housing, the first actuator coupled to a first controller, the first controller coupled to the swash plate of the catheter and configured to move the swash plate in a first plane pivoting about a pivot tip, the pivot tip connected to the catheter cap, and
   a second actuator coupled to the housing, the second actuator coupled to a second controller, the second controller coupled to the swash plate and configured to move the swash plate in a second plane pivoting about the pivot tip, wherein the first plane is aligned orthogonally to the second plane.

19. The ICE catheter handle of claim 18, wherein the first actuator and the second actuator extend outside of the housing.

20. The ICE catheter handle of claim 18,
   wherein the housing includes an elongated first aperture aligned parallel to the longitudinal axis, the first controller positioned within the housing and coupled to the first actuator within the housing, and the first actuator extends through the first aperture; and
   wherein the housing includes an elongated second aperture aligned parallel to the longitudinal axis, the second controller positioned within the housing and coupled to the second actuator within the house, and the second actuator extends through the second aperture.

* * * * *